(12) United States Patent
Maraj et al.

(10) Patent No.: US 11,820,529 B2
(45) Date of Patent: Nov. 21, 2023

(54) SYSTEM AND METHOD FOR MONITORING AND CERTIFYING AIRCRAFTS AND COMPONENTS OF AIRCRAFTS

(71) Applicant: GA TELESIS, LLC, Fort Lauderdale, FL (US)

(72) Inventors: Darryl Maraj, Parkland, FL (US); Abdol Moabery, Delray, FL (US); Alvin Khoo, Greenwich, CT (US)

( * ) Notice: Subject to any disclaimer, the term of this patent is extended or adjusted under 35 U.S.C. 154(b) by 619 days.

(21) Appl. No.: 17/084,089

(22) Filed: Oct. 29, 2020

(65) Prior Publication Data
US 2021/0122489 A1 Apr. 29, 2021

Related U.S. Application Data

(60) Provisional application No. 62/927,555, filed on Oct. 29, 2019.

(51) Int. Cl.
| | |
|---|---|
| *B64D 43/00* | (2006.01) |
| *G06F 16/22* | (2019.01) |
| *G06F 16/29* | (2019.01) |
| *H04L 9/32* | (2006.01) |
| *H04L 67/02* | (2022.01) |
| *H04L 9/06* | (2006.01) |
| *H04L 9/00* | (2022.01) |

(52) U.S. Cl.
CPC .......... *B64D 43/00* (2013.01); *G06F 16/221* (2019.01); *G06F 16/29* (2019.01); *H04L 9/0643* (2013.01); *H04L 9/3247* (2013.01); *H04L 67/02* (2013.01); *H04L 9/50* (2022.05)

(58) Field of Classification Search
CPC ....... B64D 43/00; G06F 16/221; G06F 16/29; H04L 9/0643; H04L 9/3247; H04L 67/02; H04L 9/50
See application file for complete search history.

(56) References Cited

U.S. PATENT DOCUMENTS

| | | |
|---|---|---|
| 7,860,766 B2 | 12/2010 | Seto |
| 7,908,644 B2 | 3/2011 | Roskind |
| 8,572,391 B2 | 10/2013 | Golan |
| 8,875,267 B1 | 10/2014 | Kolman |
| 8,935,769 B2 | 1/2015 | Hessler |
| 9,122,866 B1 | 9/2015 | Kolman |
| 9,160,726 B1 | 10/2015 | Kaufman |
| 9,288,217 B2 | 3/2016 | Kirkham |

(Continued)

*Primary Examiner* — Luis A Martinez Borrero
(74) *Attorney, Agent, or Firm* — Derek Fahey, Esq.; The Plus IP Firm, PLLC

(57) ABSTRACT

A method executed by a server for disseminating reports, over a communications network, for a plurality of assets is disclosed. The server receives from at least one first computing device, a first data packet comprising a plurality of asset data associated with a particular asset, and a first computing device signature associated with a first computing device. Further, after authenticating the first computing device signature, the server creates an asset record, wherein a plurality of asset data associated with the particular asset is recorded. Additionally, the server is configured for transmitting an operator interface to a plurality of operator computing devices, accessing the electronic ledger, and generating a response message to the operator request based on the plurality of asset data in the asset record.

20 Claims, 15 Drawing Sheets

(56) References Cited

U.S. PATENT DOCUMENTS

| | | | | |
|---|---|---|---|---|
| 9,547,763 | B1 | 1/2017 | Avital | |
| 9,684,775 | B2 | 7/2017 | Gupta | |
| 9,712,521 | B2 | 7/2017 | Vargas | |
| 9,875,468 | B2 | 1/2018 | Kadaster | |
| 10,026,119 | B2 | 7/2018 | Green | |
| 10,055,926 | B2 | 8/2018 | Campero | |
| 10,063,548 | B1 | 8/2018 | Laucius | |
| 10,075,298 | B2 | 9/2018 | Struttmann | |
| 10,521,780 | B1 * | 12/2019 | Hopkins, III | G06Q 20/12 |
| 10,826,685 | B1 * | 11/2020 | Campagna | H04L 9/3247 |
| 11,574,308 | B2 * | 2/2023 | Robotham | G06Q 10/0875 |
| 2006/0036537 | A1 | 2/2006 | Lawrence | |
| 2012/0284175 | A1 | 11/2012 | Wilson | |
| 2014/0289820 | A1 | 9/2014 | Lindemann | |
| 2014/0344155 | A1 | 11/2014 | Liu | |
| 2015/0046340 | A1 | 2/2015 | Dimmick | |
| 2016/0063229 | A1 | 3/2016 | Key | |
| 2016/0125199 | A1 | 5/2016 | Lee | |
| 2016/0164884 | A1 | 6/2016 | Sriram | |
| 2016/0275461 | A1 | 9/2016 | Sprague | |
| 2016/0321643 | A1 | 11/2016 | Beck | |
| 2017/0005804 | A1 * | 1/2017 | Zinder | H04L 9/3239 |
| 2017/0221288 | A1 | 8/2017 | Johnson | |
| 2017/0364700 | A1 | 12/2017 | Goldfarb | |
| 2018/0130062 | A1 | 5/2018 | O'Donnel | |
| 2018/0247302 | A1 | 8/2018 | Armstrong | |
| 2018/0260811 | A1 | 9/2018 | Bergner | |
| 2018/0341915 | A1 * | 11/2018 | Narasimhan | G06Q 50/04 |
| 2019/0303541 | A1 * | 10/2019 | Reddy | G06F 21/64 |
| 2019/0319798 | A1 * | 10/2019 | Chalkias | H04L 9/3239 |
| 2019/0340269 | A1 * | 11/2019 | Biernat | H04L 9/50 |
| 2019/0384587 | A1 * | 12/2019 | Rao | G06F 21/572 |
| 2020/0028691 | A1 * | 1/2020 | Rao | G06F 8/658 |
| 2020/0065380 | A1 * | 2/2020 | Kartoun | G06Q 10/103 |
| 2020/0074410 | A1 * | 3/2020 | Binder | H04L 9/0643 |
| 2020/0184548 | A1 * | 6/2020 | Rao | G06Q 50/18 |
| 2020/0184739 | A1 * | 6/2020 | Nathan | G06Q 10/20 |
| 2020/0204400 | A1 * | 6/2020 | Skertic | H04L 9/3239 |
| 2020/0235943 | A1 * | 7/2020 | Salimi | G06F 8/65 |
| 2020/0294128 | A1 * | 9/2020 | Cella | H04L 9/3239 |
| 2020/0351094 | A1 * | 11/2020 | Canterbury | H04L 9/0637 |
| 2021/0004739 | A1 * | 1/2021 | Gill | G06Q 50/26 |
| 2021/0044426 | A1 * | 2/2021 | Campagna | H04L 9/3239 |
| 2021/0065085 | A1 * | 3/2021 | Walls | G06Q 10/063118 |
| 2021/0135877 | A1 * | 5/2021 | Janaudy | H04L 63/126 |
| 2021/0226771 | A1 * | 7/2021 | Gale | H04L 9/3247 |
| 2021/0264444 | A1 * | 8/2021 | Chen | G06F 16/54 |
| 2021/0326872 | A1 * | 10/2021 | Robotham | H04L 9/3239 |
| 2021/0399889 | A1 * | 12/2021 | Muthukrishnan | G06Q 20/3829 |
| 2022/0343292 | A1 * | 10/2022 | Hochman | B64F 5/60 |
| 2023/0153812 | A1 * | 5/2023 | Robotham | G06Q 10/083 705/67 |

* cited by examiner

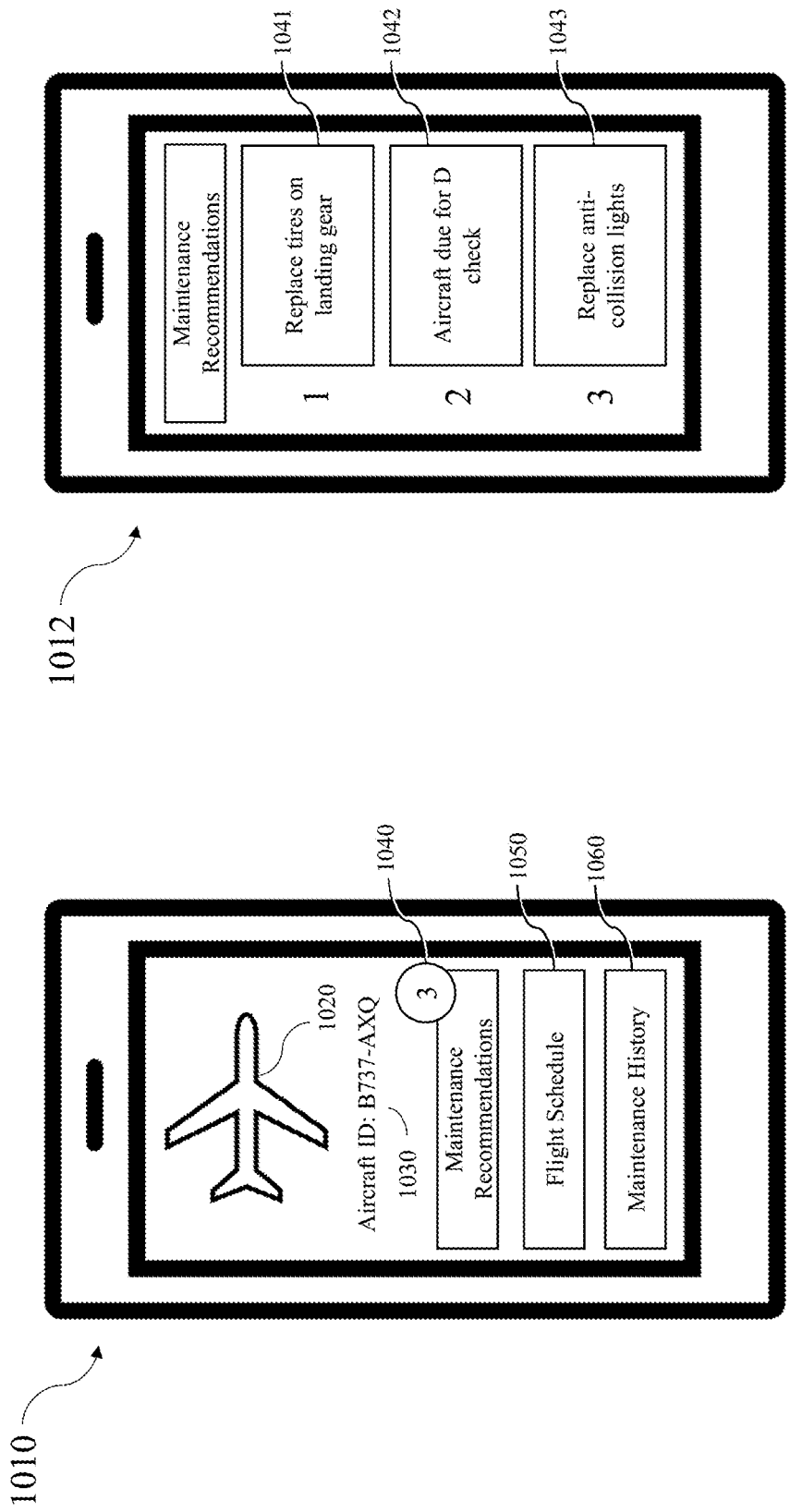

SYSTEM AND METHOD FOR MONITORING AND CERTIFYING AIRCRAFTS AND COMPONENTS OF AIRCRAFTS

CROSS-REFERENCE TO RELATED APPLICATIONS

This application claims the benefit of the filing date of U.S. Provisional Application Ser. No. 62/927,555 entitled "METHODS AND SYSTEMS FOR MONITORING AND CERTIFYING AIRCRAFTS AND COMPONENTS OF AIRCRAFTS" and filed Oct. 29, 2019, the subject matter of which is incorporated herein by reference.

TECHNICAL FIELD

The present invention relates to the field of distributed ledger technology, and more specifically to the field of monitoring and certifying aircrafts and aircraft components.

BACKGROUND

In modern aeronautical systems, assets such as aircrafts and components of aircrafts are disseminated and stored across a wide geographic span. Due to the unprecedented and abundant amount of aircraft travel, whether private or commercial, aircrafts and components of aircrafts are constantly being removed, fixed, or replaced in order to seamlessly meet the demands of the current aeronautical industry. A common issue associated with meeting these demands is accounting for factors such as the location, the status of repair, and the applicable certifications, such as airworthiness and conformance, related to the aircraft components. Another common issue is the lack of ability for applicable entities to provide a security mechanism associated with monitoring and certifying aircrafts and their components allowing otherwise sensitive information related to the process to be viewed by unwanted parties. Due to some of the disadvantages of the current approaches, the process of monitoring and certifying aircrafts and their components is not only time-consuming, but also requires a significant number of arduous tasks that must be performed manually.

Because of these issues, many times airlines will spend significant funds to recertify components that may already been certified because paperwork and data on the components may have been lost. This can be an extreme waste and time, resources, and money. Additionally, one of the issues with certification of aircraft components is a significant amount of time and money goes into determining the trustworthiness of airline components. Many of these problems can be fixed if aircraft component monitoring and certification was recorded on a single shared ledger. Currently, single shared ledgers do exist, but a combination of technological and practical constraints have made such ledgers difficult to apply to the aeronautical industry. In particular, the lack of ability to account for the massive quantities of information related to the process along with the inability to utilize real-time data in order to predict aircraft components in need of replacement or repair, and the lack of security associated with the aforementioned data renders the approach difficult to apply to the industry. As a result, there exists a need for improvements over the prior art, and more specifically, a system and method configured to provide automated and secure significant tasks associated with the repairing, certification, and authorization of aircrafts and components of aircrafts.

SUMMARY

A system and method executed by a server for disseminating reports for a plurality of assets is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method executed by a server for disseminating reports, over a communications network, for a plurality of assets is disclosed. In one embodiment, the system comprises at least one processor, and an electronic ledger. In one embodiment, the method comprises (a) receiving, from at least one first computing device, (i) a first data packet comprising a plurality of asset data associated with a particular asset and (ii) a first computing device signature associated with a first computing device, wherein the plurality of asset data comprises a unique asset identifier associated with the particular asset and a plurality attributes associated with the particular asset, wherein each attribute has a metric and wherein the first computing device signature provides non-repudiation and data integrity of the first data packet, (b) creating, on an electronic ledger, an asset record, (c) recording, in the asset record, the plurality of asset data associated with the particular asset after authenticating the first computing device signature, (d) transmitting, over the communications network, an operator interface to a plurality of operator computing devices, wherein each operator computing device is associated with a unique operator computing device signature, and wherein the operator interface is configured for receiving an operator request for asset data for one of the plurality of assets, (e) receiving, over the communications network, at the direction of an operator, an operator request message for the asset data, wherein the asset data is associated with at least one of the plurality of attributes for one of the plurality of assets, where the operator request message for the asset data comprises (i) the unique asset identifier, (ii) an operator computing device signature associated with the operator computing device, (iii) and a geographic location for the operator computing device, (0 accessing, in the electronic ledger, the asset record associated with the operator request and reading the plurality of asset data in the asset record, (g) generating a response message to the operator request based on the plurality of asset data in the asset record, wherein the response message corresponds to the operator request and includes (i) at least one metric associated with at least one of the plurality of attributes of the particular asset and (ii) a geographic attribute corresponding to information related to the geographic location of the operator computing device.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 10a is an example embodiment of an asset record interface for an aircraft, including a maintenance recommendations portion;

FIG. 10b is an example embodiment of a maintenance recommendation interface originating from the asset record interface of FIG. 10a.

DETAILED DESCRIPTION

Figure 1:
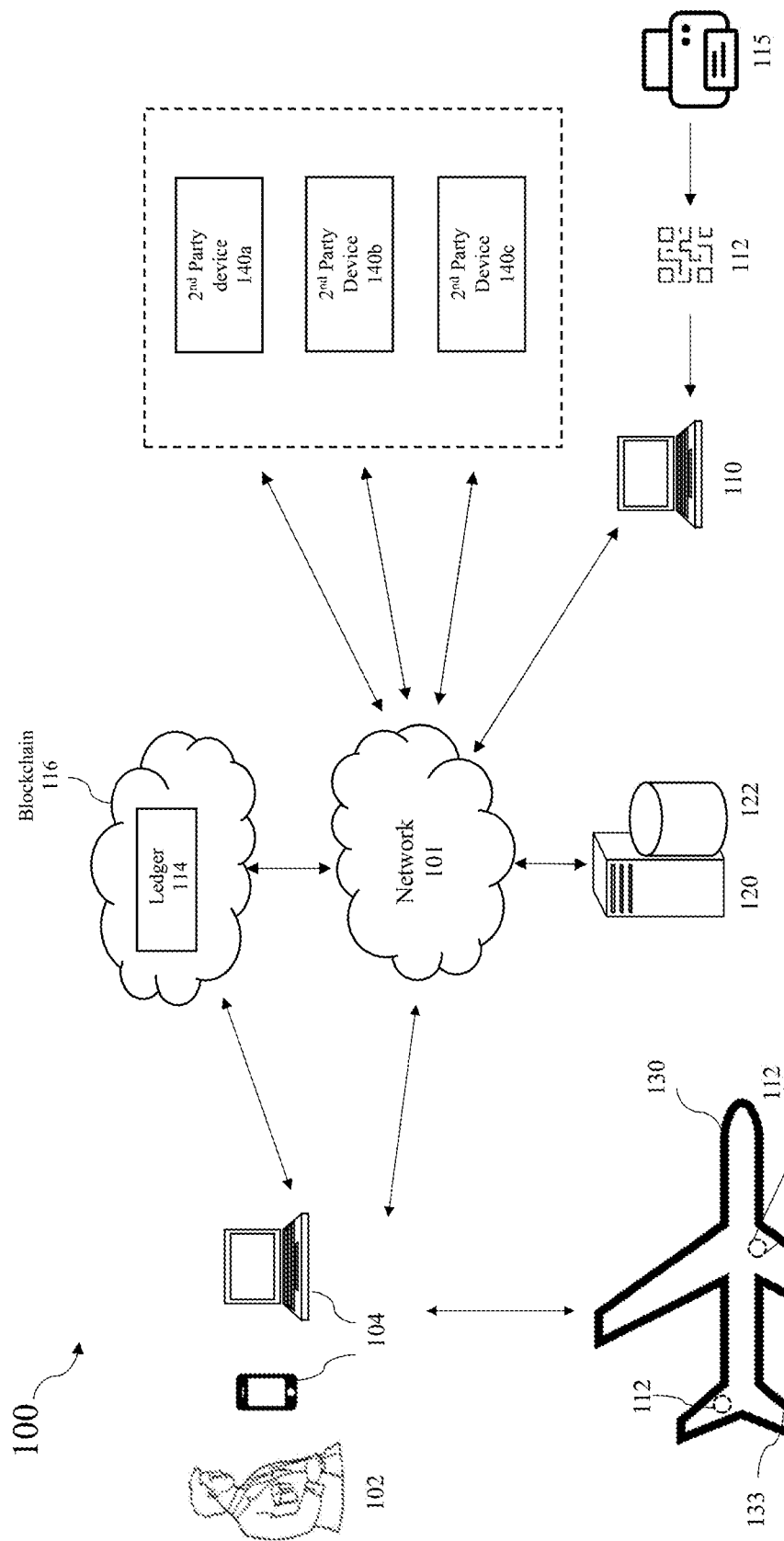
FIG. 1 is a block diagram illustrating a system for monitoring and certifying aircraft and aircraft parts, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that monitors and certifies aircrafts and components of aircrafts utilizing unique identifying marks affixed (e.g., physically attached, physically adhered to) to the aircrafts and/or components of the aircrafts. Based on a scanning of a unique identifying mark (e.g., a printed unique identifying mark), asset record data related to the aircraft and/or its' components may be requested and received from a server. Asset records associated with the component(s) are created and stored in a ledger (e.g., an electronic ledger on a blockchain), allowing monitoring and certification of the aircraft and aircraft components to be performed in an encrypted and secure manner. The system may further employ machine learning algorithms in order to perform analyses and predictions related to the asset record data associated with the aircraft and its' components. The system also provides a unique interface for users to easily choose an aircraft component that the user would like to investigate. In one embodiment the unique interface includes a wheel- and/or ring-type interface for toggling between the various data sources, such as maintenance records, warranty status records, IPC/CMM documentation etc. The system also allows the user to generate reports that include information regarding the provenance of the devices that input the data related to particular item.

i. Operating System/Environment

Referring now to the Figures, and with particular reference to FIG. 1, a system 100 is shown. System 100 includes a combination of hardware and software. In some embodiments, the various methods described herein are implemented at least partially by hardware of one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

As illustrated, system 100 includes a network 101 in communication with an operator 102 via the operator's device 104, a first device 110, a blockchain 116 having a ledger 114, a server 120 and database 122, and a plurality of second party devices (140a-140c). Network 101 may include one or more packet switched networks, such as the Internet, or any local area networks, wide area networks, enterprise private networks, cellular networks, phone networks, mobile communications networks, or any combination thereof. Network 101 communicatively couples each component of system 100 and may utilize known security precautions such as encryption, passwords, limited Wi-Fi range, and the like.

As noted above, the plurality of second party devices (140a-140c) may be decentralized. The term, "plurality of decentralized second party devices" means a plurality of second party devices that are not in a single location or located on a single machine. In its simplest form, a decentralized network eliminates the need for one central server or entity and allows for multiple nodes (servers) to act together to complete a specific task. Decentralized networks are organized in a much more distributed fashion. Each node within the network functions as a separate authority with independent decision-making power regarding how it interacts with other systems. These networks also distribute processing power and workload functions among connected servers.

As noted above, the operator 102 may operate an operator device 104. System 100 also includes a first device 110 and a plurality of second devices (140a-140c). The operator device(s), first device 110, and/or second devices (140a-140c) may be any suitable computing device. Non-limiting examples of computing devices that may be used include a laptop computer, a tablet computer, a smartphone, a desktop computer, and any other computing device used to access networks and software. Generally speaking, the operator device 104 and first device 110 is one or more of a remote computing device, such as a tablet computer, a smartphone, and a laptop computer. The plurality of second devices (140a-140c) may similarly be one of these remote computing devices, further including non-remote computing devices such as desktop computers and servers. The blockchain 116 may be comprised of a plurality of any of the foregoing computing devices. Moreover, the second party devices (140a-140c) may make-up the blockchain 116 or may be a subset of the devices on the blockchain 116.

An example of software that executes on the computing devices (104, 110, 140a-140c) includes a platform configured to organize, monitor, and analyze data associated with identifying mark 112. The identifying mark 112 may be processed by a machine learning component (not illustrated). For instance, a machine learning component may utilize received data obtained from the system to generate a model function for a set of input and output training data. Training data includes multiple training instances which may correspond to data retrieved from the identifying mark 112 including, but not limited to Aircraft Maintenance Manual (AMM), IPC, Trouble Shooting Data, Maintenance History, All Maintenance Release Paperwork, Traceability Data, Reliability Data, Warranty Administration, TSN/SO-CSN/CSO, and any other applicable data pertaining to aircraft 130 and/or aircraft components 133.

System 100 includes a printing device 115 configured to generate a unique identifying mark 112. The unique identifying mark 112 may be printed in any suitable fashion. For instance, the unique identifying mark 112 may be printed by printing device 115 onto a parchment of sorts having an adhesive side and a printing side. The adhesive side may be exposed by removing a barrier to expose the adhesive, followed by affixing (e.g., adhering, attaching) the unique identifying mark 112 to the aircraft 130 and/or aircraft components 133. Non-limiting examples of unique identifying marks include, but are not limited to, a quick response code ("QR code"), a bar code (e.g., codablock), an access code (e.g., a string of random numbers/letters of a specified length), an identification ("id") tag, a hexadecimal code, a binary code, a bokode, a color code, a high capacity color barcode (HCCB), a radio frequency identification ("RFID") chip, a near-field communication ("NFC") chip, and/or any other suitable machine-readable representation of data. In one embodiment, the unique identifying mark is preferably a QR code or barcode. Advantageously, a QR code and/or barcode may graphically represent a unique data element, such as a string of characters and/or numbers.

As noted above, the unique identifying mark 112 may be a printed mark, however, non-printed marks such as laser-etched marks may be used and are within the spirit and scope of the invention. As described in greater detail below, the unique identifying mark 112 may be used as a unique asset identifier. In this way, the unique identifying mark may allow a user to quickly access records associated with a particular asset. As a non-limiting example, a user may readily access a plurality of asset data (e.g., installation date, replace by date) associated with a particular asset (i.e., an aircraft component) by simply scanning (e.g., via a smartphone) a QR code found on the surface of the particular asset.

As noted above, system 100 includes aircraft asset 130. The operator may be in proximity with an aircraft asset 130. Aircraft asset 130 includes a plurality of aircraft components 133. An aircraft component may be any component found on an aircraft. In one embodiment, an aircraft component is an engine component. In one embodiment, an aircraft component is a wing component. In one embodiment, an aircraft component is a cabin component. In one embodiment, an aircraft component is a galley component. While the present disclosure may generally discuss aircrafts and aircraft components as assets, it is understood, that other types of assets may be used and are within the spirit and scope of the present invention.

At least two of the aircraft components 133 include a unique identifying mark 112. Each of the plurality of aircraft components 133 may be identified by their respective unique identifying marks 112, and each unique identifying mark 112 may be associated with a unique data element, such as a record identification number. Identifying marks may be utilized (e.g., scanned) to programmatically obtain asset records associated with the asset. The asset records may include one or more metrics associated with one or more attributes of the asset. An example of an asset record is a documentation record associated with the particular asset. For instance, the tires of the landing gear of an aircraft may come with documentation of attributes associated with the particular tires and the documentation may outline the recommended number of landings before replacing the tires. Other types of metrics associated with the asset may also be used and are within the spirit and scope of the present invention.

Another example of an asset record is a maintenance record. A maintenance record may include, for instance, metrics concerning an attribute of the landing gear tires. It is understood that metrics may measurements, dates, times, quantities, statistics, probabilities, alphanumeric characters, colors, shades, etc. For instance, data relating to the last time the tires of the landing gear were inspected may be included. Other types of asset records include a geolocation associated with a particular asset, an Illustrated Parts Catalog (IPC) associated with the particular asset and Component Maintenance Manual (CMM) associated with the particular asset.

In another aspect, asset record data may also include ownership data. An aircraft asset 130 may include aircraft components 133. and the entity that owns the aircraft asset 130 may differ from the entity that owns one or more of the aircraft components 133. As a non-limiting example, turbine blades in the engines may be owned by an entity other than the aircraft itself. For instance, the turbine blades may be leased by an entity to an airline. Thus, in some embodiments, an asset record includes ownership data. Ownership data may also include chain of title data, i.e., data indicating dates of the transfer of ownership and the entities involved in the transfer of ownership.

Various communications may be sent to and from the entities shown in system 100 using server 120. For instance, and with reference to the figures now including FIG. 2, server 120 may receive a first data packet comprising a plurality of asset data associated with a particular asset record 223 to be added to ledger 114. In response to the first data packet 210, server 120 may generate and send a message 220 to the ledger 114 on the blockchain 116 to create and store the asset record(s) on the ledger 114. In response to message 220, blockchain 116 may send a response message, including an approval or denial of the first device's 110 request to add an asset record to the ledger 114.

In another example, operator 102 may be sent an operator interface message 230, where the operator interface message 230 comprises an operator interface or graphical user interface. The operator interface message may be configured to display an interface configured to receive input, at the direction of the operator, which may include alpha numeric characters, audio content, and visual content, among others. The operator 102 may send an operator request message 240 to request at least a portion of an asset record 223. The portion of the asset record may include metrics associated with attributes associated with a particular asset or a portion of the asset. Server 120 may process the operator request message 240 and send an access message 250 to blockchain 116. Blockchain 116 may respond with an approval or denial in a blockchain response message 260 and a copy of the asset record 261 requested. Server 120 may process the copy of the asset record 261 and send a response message corresponding to the operator request message 240.

Figure 5A:
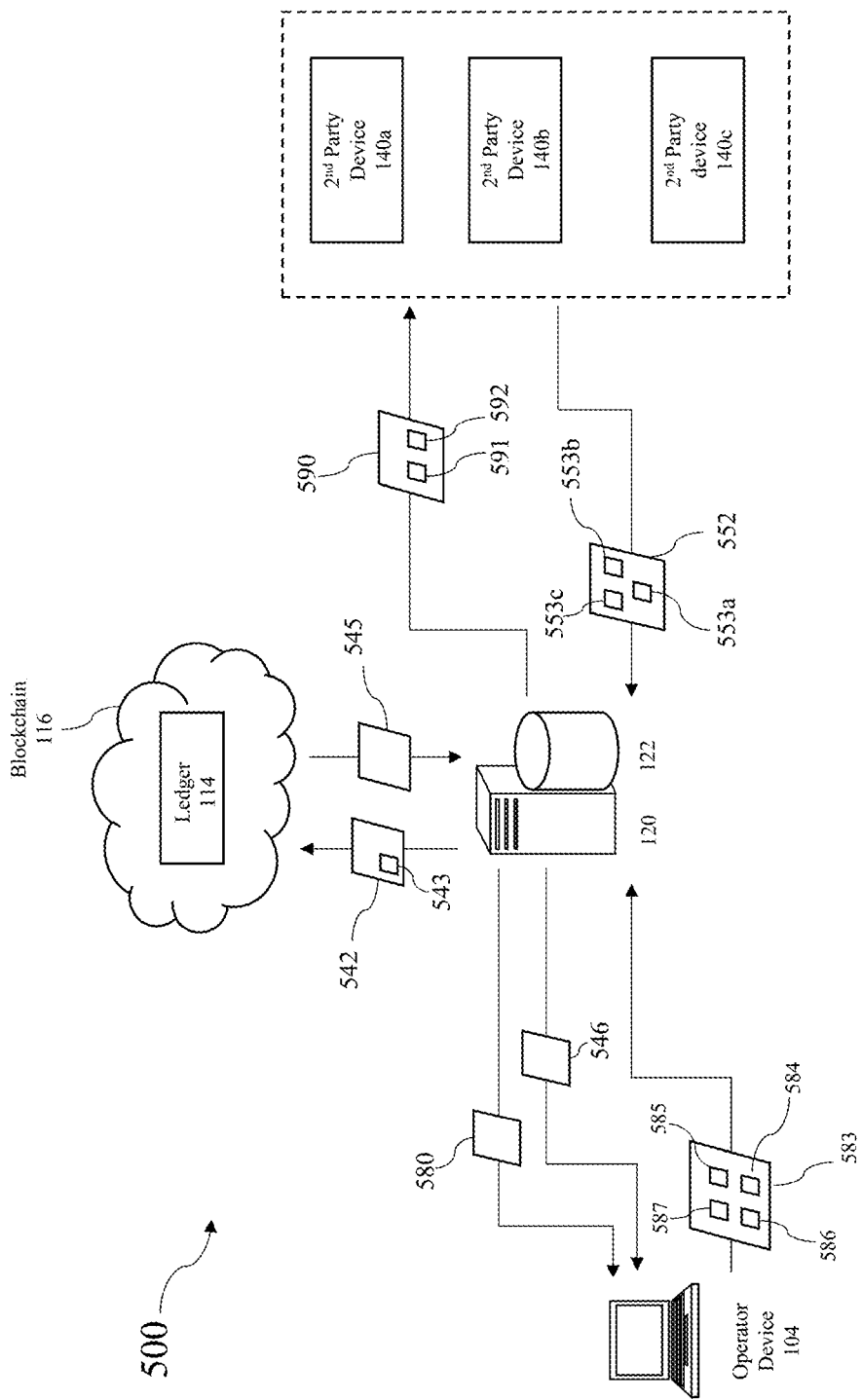
FIG. 5a is a schematic illustrating the flow of data in relation to example embodiments for updating an asset record.

In another example, and now with reference to the figures including FIG. 5a, operator 102 may be sent a second operator interface message 580 for updating an asset record. Operator 102 may respond with update request message 583. After receiving the update request message 583, server 120 may generate and send an authentication request message 590 requesting a plurality of second party devices (140a-140c) to authenticate the update request in update request message 583. The second party devices (140a-140c) may respond with a plurality of authentication request message responses 552. After receiving the responses 552, server 120 may send an update message 542 to blockchain 116 to appropriately update the asset record(s) on the ledger 114. The blockchain 116 may in turn respond with an update response message 545, which may be sent in a copy of the response message 546 to the operator's device 104.

Such exemplary communications described above may be sent via an appropriate protocol, such as via Hyper Text Transfer Protocol ("HTTP") and/or Hypertext Transfer Protocol Secure ("HTTPS"). Other transfer protocols may be used and are within the spirit and scope of the invention.

Server 120 may be in communication with database 122. The database may store a variety of data, including data associated with any of the aforementioned communications. Database 122 may permanently, or transiently store all or portion(s) of the data included in the aforementioned communications. In one embodiment, database 122 may be a relational database comprising a Structured Query Language (SQL) database stored in a SQL server, and may be distributed over one or more nodes or locations that are connected via network 101. Database 122 may accumulate data from the transactions that occur on system 100. The data from the transactions may be used, for instance, to train machine learned algorithms. For instance, machine learned algorithms for authenticating data may be produced from accumulated data.

System 100 also includes blockchain 116 comprising a ledger 114, such as an electronic ledger. A blockchain 116 is a peer-to-peer network for storing data. For the methods and systems described herein, the blockchain 116 is used to store a plurality of asset data, as well as signatures that ensure non-repudiation and data integrity of the asset data. In this way, the blockchain 116 may serve a consensus of replicated, shared, and synchronized digital data geographically spread throughout system 100. Computer nodes may maintain the blockchain 116 and cryptographically validate (further explained below) each new block and thus records relating to the assets (e.g., aircraft components) contained in the corresponding block. In one embodiment, ledger 114 includes a plurality of nodes stored in database 122 configured to independently operate, update, and replicate.

It will be appreciated by those of ordinary skill in the art that a blockchain is a distributed ledger, meaning that the ledger is spread across a plurality of devices in a kind of peer-to-peer network. In other words, the electronic ledger is distributed over a decentralized communications network. The blockchain ledger may be cryptographically secured and data can only be added to the blockchain. Asset records on the ledger may be updated, however, due to the nature of the blockchain the prior records are retained. In this way, a request to access an asset record is generally directed toward the most recent, up-to-date, asset record. However, previous asset record data may be accessed as well due to the nature of the blockchain.

Critically, any additions and/or transactions (i.e., newly created blocks) made to the blockchain are validated by other devices (e.g., plurality of second devices 140a-140c) in the network against one or more criteria defined by the blockchain protocol. The additions and/or transactions to the blockchain are only made final and added to the blockchain ledger after a consensus has been reached among the validating devices (e.g., second party devices (140a-140c)) on the network.

Figure 7:
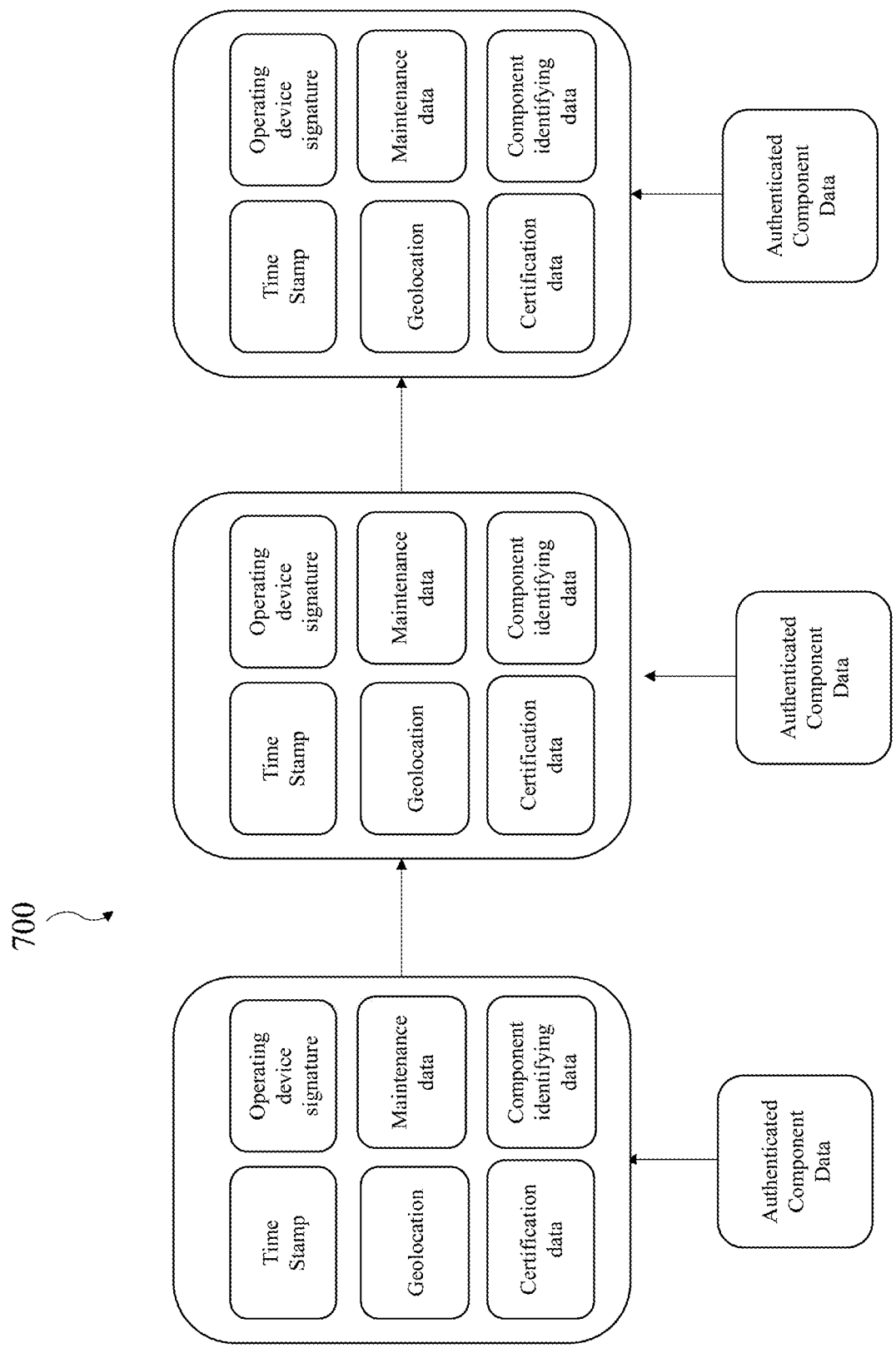
FIG. 7 is a block diagram illustrating a blockchain configured to be included in the system for monitoring and certifying aircraft and aircraft parts, according to an example embodiment.

Referring now to FIG. 7, an example 700 of blockchain 116 associated with ledger 114 is depicted. A block chain or blockchain is a distributed database that maintains a list of data records on the ledger. A block chain typically includes several nodes. Each of the nodes may be one or more computers, databases, data stores, machines, operably connect to one another. In some cases, each of the nodes or multiple nodes are maintained by different entities. Blockchain 116 typically works without a central repository or single administrator. The data records recorded in the block chain are enforced cryptographically and stored on the nodes of the block chain. A block chain provides numerous advantages over traditional databases. The nodes of blockchain 116 may reach a consensus regarding the validity of a record contained on ledger 114. Records are created by users using the block chain in its normal course of business, for example, when someone sends cryptocurrency to another person, blocks are created by users known as "miners" who use specialized software/equipment to create the blocks. In the present invention, the user may access the system or provide data configured to be associated with asset records, such information will be recorded on the ledger 114 on the blockchain 116 but only if a threshold consensus has been reached (discussed in greater detail below).

Figure 6:
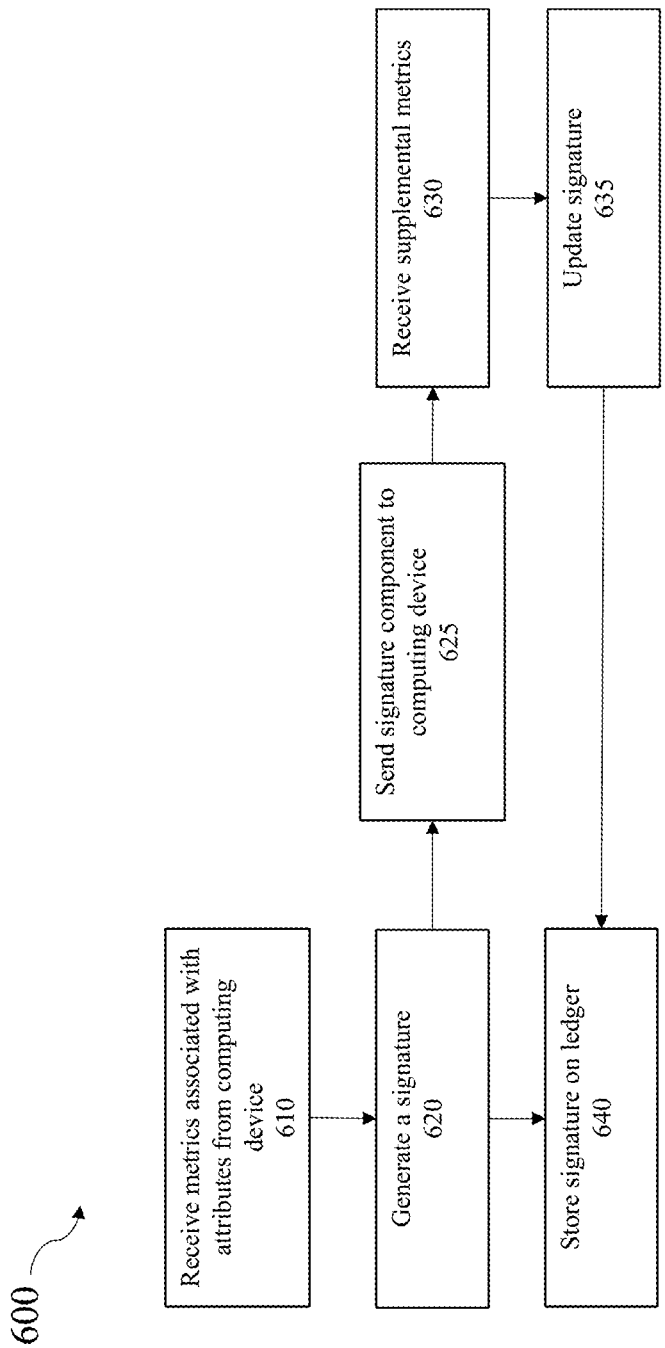
FIG. 6 is a block flow diagram for generating and updating a signature a computing device, according to example embodiment.

An entity such as an operator 102 may provide a cryptographic signature to ensure data integrity and non-repudiation of an operator's request. Other signatures, such as signatures from a first device 110 may also be implemented in the described methods and may similarly provide substantially the same benefits. One embodiment for providing a signature (not necessarily cryptographic) is discussed below in relation to FIG. 6. In one embodiment, cryptographic identities (e.g., cryptographic signatures), are generated using the Libsodium library, against the Ed25519 elliptic curve. In effect, this allows the ledger 114 to act as a ledger for storing information that is publicly available and the root of trust may be some trusted entity and/or certifying entity, such as the plurality of second party devices (140a-140c), which may also be authenticated according to the methods described in relation to FIG. 6.

ii. Methods

As noted above, the present invention relates to systems and methods for disseminating reports for a plurality of assets. More particularly, the present invention relates to systems and methods for disseminating reports (e.g., asset records) for aircraft assets (e.g., the aircraft itself, particular aircraft components). As will become apparent with the foregoing description, a first user may create an asset record for a particular asset. The asset is generally associated with some type of identifying mark (e.g., a printed, unique, identifying mark), and the asset record is stored on a ledger. After producing the asset record, an operator, such as an employee of an airline corporation, may desire to inspect the particular asset. An operator may also desire to update an asset record (e.g., to reflect the occurrence of maintenance). The systems and methods described herein allow for the creation of asset records, accessing the asset records, and updating the access records. Significantly, the systems and methods include methods for storing the data in a manner that ensures data integrity.

In one aspect of the invention, data integrity is ensured by providing signatures from the operator's device 104 and/or first computing device(s) 110 in the communications originating from those respective devices. Additionally, it is understood that each of the second computing devices providing a consensus may also include a signature that may also be recorded on the ledger 114. As previously noted, the signature may be a cryptographic signature, a non-cryptographic signature, and combinations thereof. In one embodiment, and with reference now to FIG. 6, a method 600 for generating a signature for a computing device associated with the system is shown. As illustrated, the method comprises a first receiving step 610. In first receiving step 610, metrics are received, by server 120, over the network 101. After the receiving the metrics step 610, the method includes a generating a signature step 620. The signature may be produced based on certain metrics associated with the computing device. For instance, metrics such as the particular device (e.g., a device ID, a record ID), the geolocation of the particular device, the internet protocol address ("IP address"), the time of day, and the frequency of information that is requested, the time of day requests are received from the device, among others. The unique signature produced in the generating step 620 may be a cryptographic signature or proof and may also not be a cryptographic signature. Furthermore, the signature may include cryptographic components and non-cryptographic components. Regardless, after the generating step 620, server 120 may send the signature to the computing device in a sending step 625. In this sending step 625, the server 120 may also request supplemental metrics. In receiving step 630, server 120 receives the supplemental metrics. Based on the received metrics, the signature may be updated in an updating step 635. After updating the signature in updating step 635, a signature update message is sent to blockchain 116 and ultimately, in step 640, stored on ledger 114. The signature allows the system to determine if the information received from the computing devices is authentic and allows for the non-repudiation of the data received. Additionally, graphical representations of the cryptographic signatures may also be included in the reports (as illustrated in FIG. 8c) to further help users to identify that a particular component number, or information related to a particular component, has been authenticated.

Figure 2:
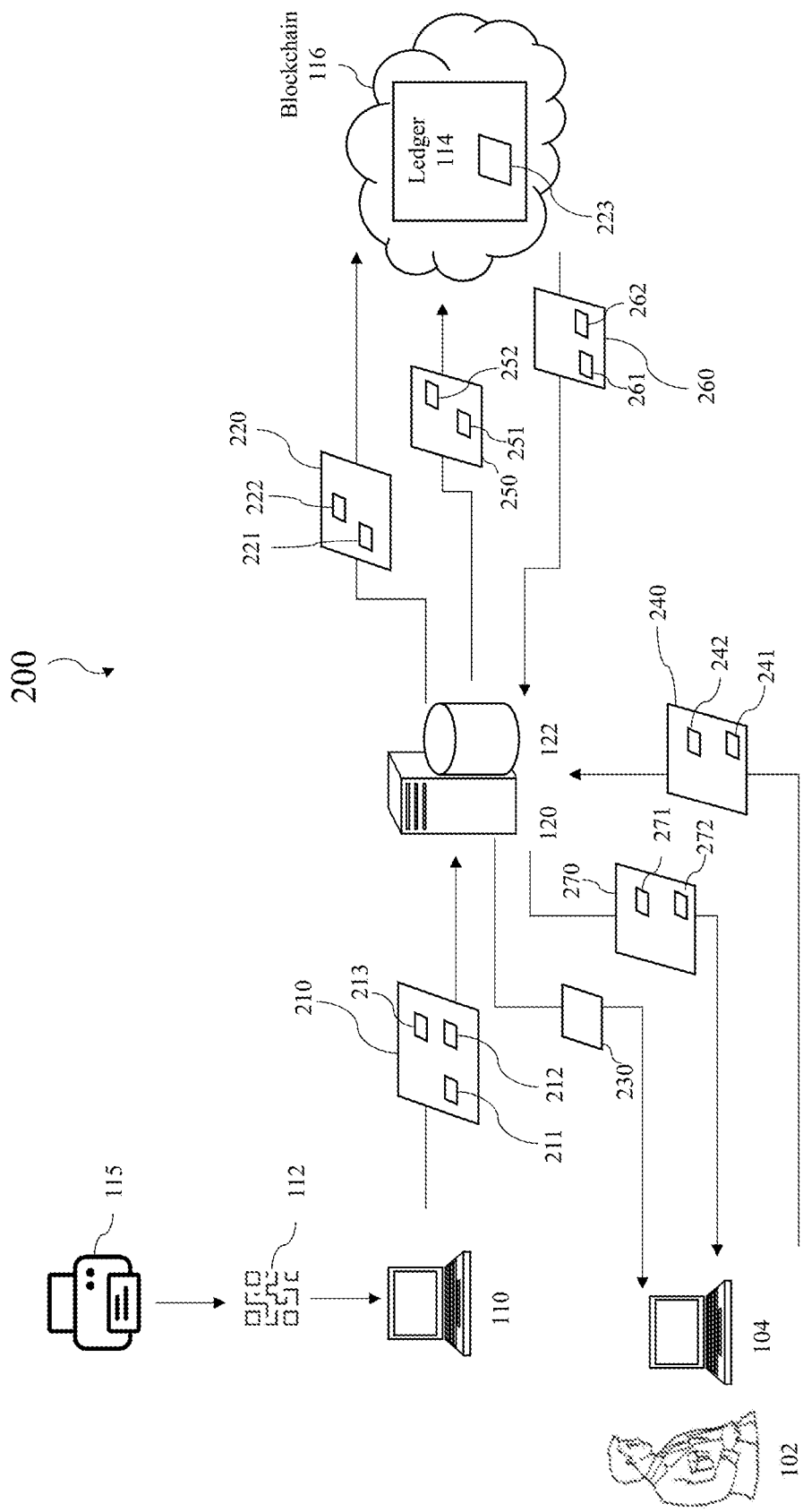
FIG. 2 is a schematic illustrating the flow of data in relation to example embodiments for creating and storing an asset record, and accessing the asset record by an operator.
Figure 3:
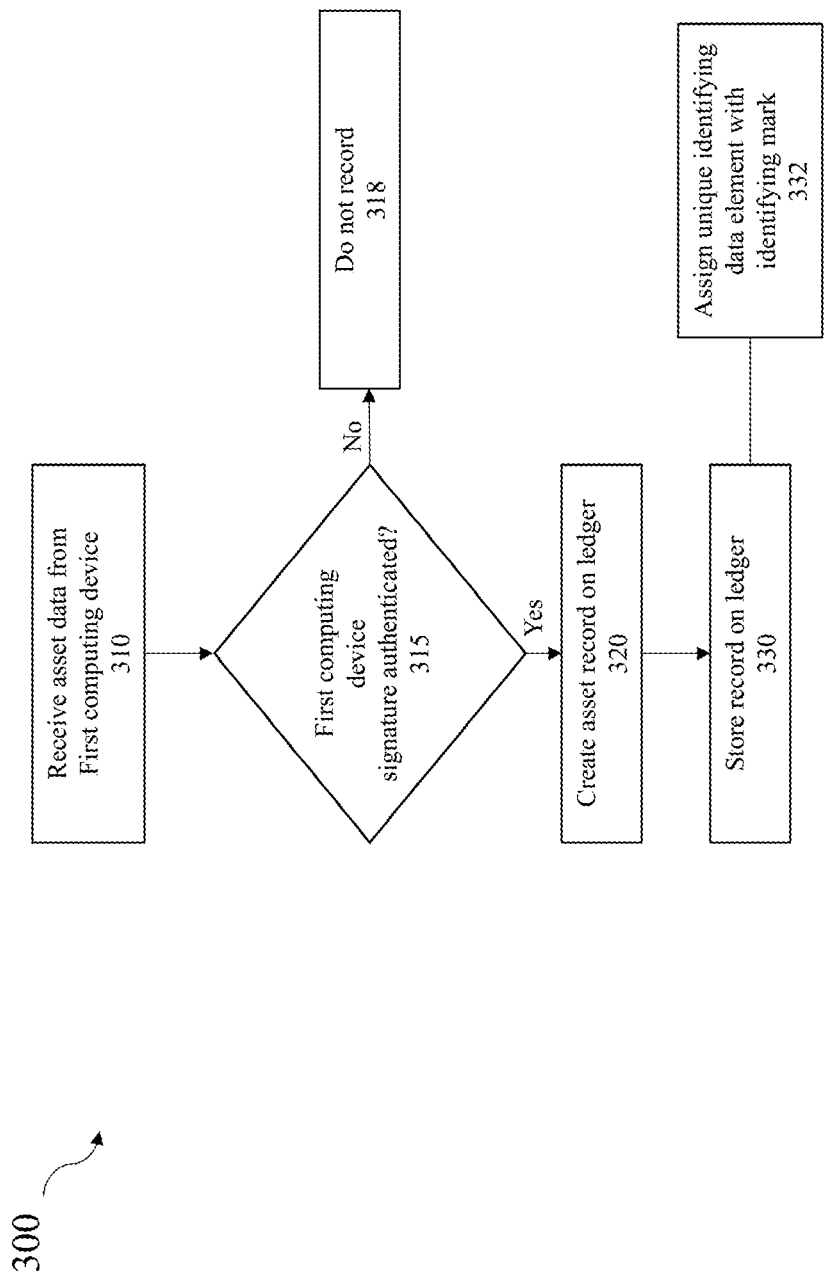
FIG. 3 is a block flow diagram of an example embodiment for creating and storing an asset record on a ledger.

With reference now to FIGS. 2 and 3, a schematic 200 illustrating the flow of data and a method 300 for creating an asset record are shown. Using method 300, asset records for a plurality of assets may be produced and stored on a ledger 114 using a blockchain 116. As illustrated, the method comprises a receiving step 310. In receiving step 310, the server 120 receives a plurality of asset data (211-212) from first computing device 110. Next, in step 315, the server will determine if the signature associated with the information received from the first computing device received in the data packet from first computing device has a signature that matches the first computing device signature of the first computing device, which may be stored in the attached database 122. As explained below, the first computing device may have been authenticated prior to the server receiving the information from the first computing device. If the signature of the first computing device does not match the signature of the first computing device stored in the first signature device record in the attached database, then the process moves to step 318 and the system may not record information related to a particular asset in a particular asset's record. On the other hand, if the first computing device is authenticated, then the process may move to step 320. The authentication step may also be performed by sending a data packet to the decentralized network of second party devices to each perform an authentication of the signature of the first device and may find that the first computing device's signature is authentic if a consensus between the plurality of second party computing devices has been achieved.

The plurality of asset data (211-212) may be included in a first data packet 210. The first data packet, in one embodiment, may be sent via HTTP or HTTPS, preferably HTTPS. The plurality of asset data (211-212) may be associated with a particular asset, such as a particular aircraft, or an aircraft component. The first data packet may also include the signature of the computing device that sent the first data packet. By authenticating the signature, the data associated with the asset may be proven to be authentic. The plurality of asset data (211-212) may also include a unique asset identifier, such as a part number (e.g., manufacturer-provided part number), or other ID. The unique asset identifier is generally a string of characters and/or numbers, whereas identifying mark 112 is a graphical data identifier that may graphically represent the string of characters and/or numbers. The unique asset identifier may be advantageous to include in the asset record 223. For instance, the server 120 may be programmed to automatically associate useful information, such as a user manual, with the asset record 223 based on the unique asset identifier.

As mentioned above, the receiving step 310 may also include receiving a signature 213 from the particular computing device that sent the plurality of asset data, which as explained above may be included in the first data packet 210. As noted above, the signature may be a cryptographic signature or a non-cryptographic signature. In one embodiment, the signature may be associated with the first computing device 110. In one embodiment, the signature is from an operator's device 104. Regardless of the type of signature used, the signature may provide non-repudiation and data integrity of the data packet 210.

After the receiving step 310 and the authenticating step, the method 300 comprises a creating step 320. The creating step 320 comprises creating an asset record 223 on ledger 114. After the creating step, the method includes a storing step 330, where the asset record 223 is stored on the ledger 114. The creating step 320 may comprise, for instance, using server 120 to send a message 220 to the blockchain 116, the message comprising a first portion of code 221 to create the asset record on the ledger 114. Furthermore, as illustrated, message 220 includes a second portion of code 222, the second portion of code 222 comprising a plurality of asset data to store in the asset record 223. Thus, the creating step 320 and storing step 330 may occur simultaneously (e.g., concomitantly) or separately.

The storing step 330 may comprise recording, in the asset record 223, the plurality of asset data (211-212) associated with the particular asset. In one embodiment, the plurality of asset data (211-212) is recorded after authenticating the first computing device signature (discussed above). Furthermore, the method may include an assigning step 332, where a unique identifying data element is assigned to the identifying mark 112. For instance, the unique identifying data element may be a record ID. As a non-limiting example, a particular QR code (identifying mark 112) may be assigned a unique string of characters and/or numbers. As a non-limiting example, a part ID (e.g., originating from the manufacturer or part owner) comprised of a string of characters and numbers, such as AXW11134 may be assigned a particular QR code. After a user scans the particular QR code, the user's computing device may make a request to server 120 to obtain the asset record data having a corresponding part ID of AXW11134. In this way, the identifying mark 112 may be associated with a particular record ID, and in turn the part ID may be used to readily access asset records by requesting them from server 120.

Multiple unique identifying data elements may be included in an asset record. For instance, an asset record may include a unique identifying data element to identify the particular asset. An additional unique identifying data element may be included, and the additional data element may identify the asset that the particular asset belongs to. For instance, a first asset record may be an asset record for an aircraft, and a plurality of second asset records associated with components of the aircraft may be stored in the aircraft's asset record. The unique identifying element, such as an aircraft ID number, may be stored in the parent asset record, as well as the asset record of each individual component. In this way, scanning an identifying mark 112 to retrieve an asset record may retrieve a plurality of asset records. Server 120 may process the plurality of asset records associated with an entire aircraft and may make maintenance recommendations to the operator. Advantageously, the operator may be apprised of critical maintenance checks by simply scanning the unique identifying mark 112. An example of this is shown and described in relation to FIG. 10b.

Figure 4:
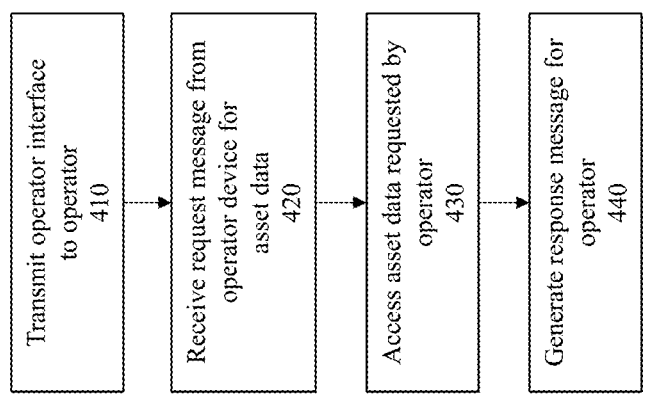
FIG. 4 is a block flow diagram of an example embodiment for accessing, by an operator, an asset record on the ledger.

With reference to the figures now including FIG. 4, a method 400 for an operator to update an asset record is shown. The method includes a transmitting step 410 that includes transmitting, over the network, to an operator interface to one or more operator computing devices. The transmitting may include transmitting an operator interface message 230 from the server 120 to the operator device 104. The operator interface message 230 generally includes information configured to display an operator interface. The operator interface may be configured for receiving an operator request for asset data (e.g., aircraft component data) for one of the particular assets recorded on the ledger 114 if the information from the operating computing device is authenticated. Lastly, each operator computing device may be associated with a unique operator computing device signature, which may be stored in the database 122, or may be available or stored in the authenticating second party computing devices.

Figure 8A:
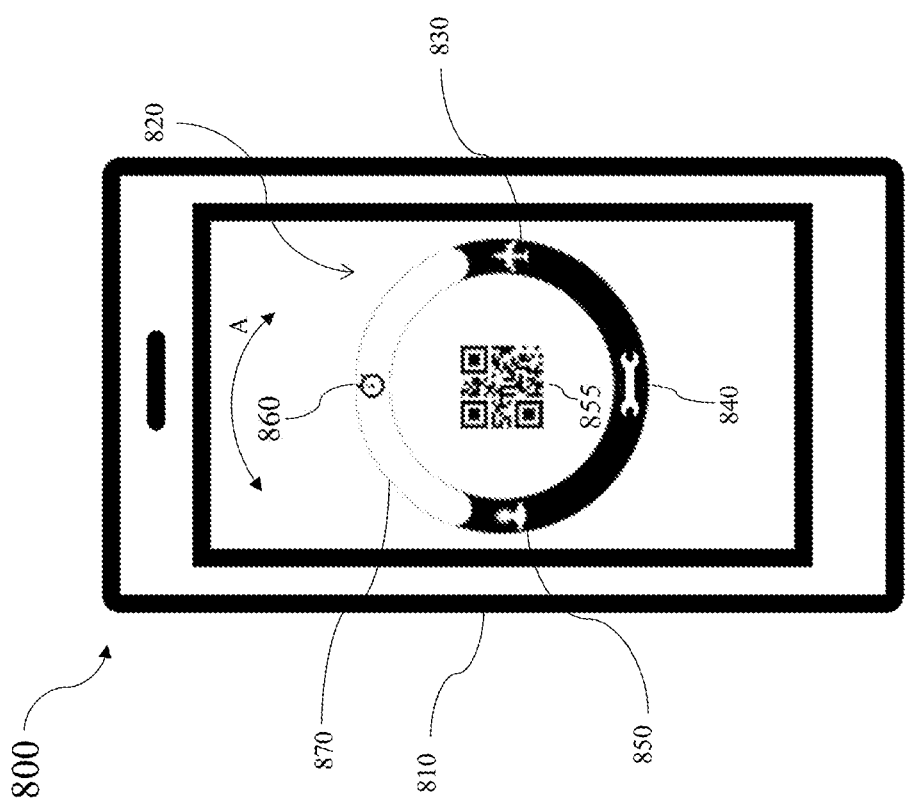
FIG. 8a is an example embodiment of a graphical user interface of an operator interface.
Figures 8B, 8C:
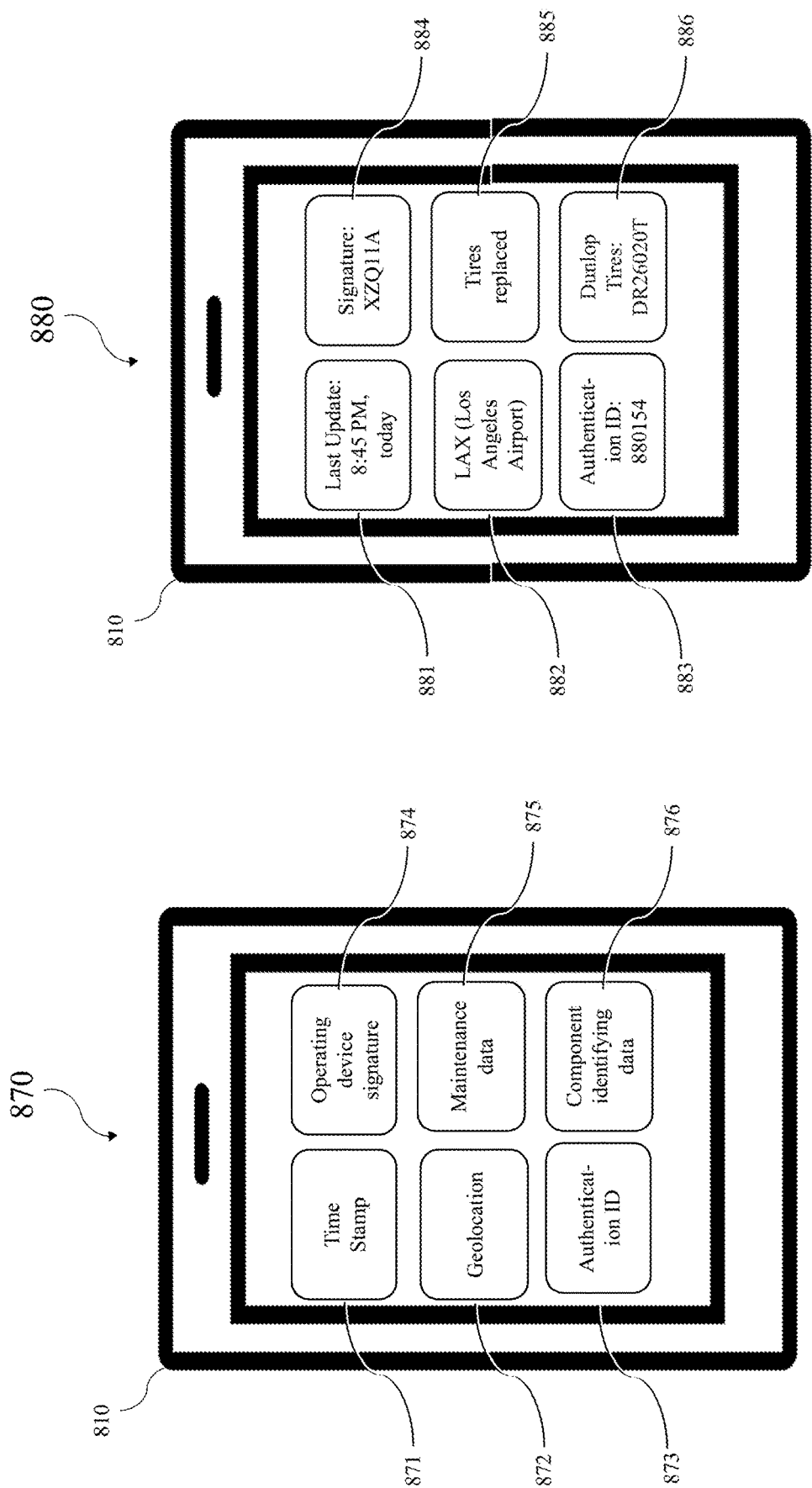
FIG. 8b is an example embodiment of a graphical user interface of an operator interface.
FIG. 8c is an example embodiment of the graphical user interface depicted in FIG. 8b, which includes example data in report.

With reference to FIG. 8a, a particular operator interface 800 is shown. The interface depicted on computing device 810 may allow a user to toggle between various components of information relating to an aircraft and/or components of said aircraft. As illustrated, the operator interface 800 includes a ring- or wheel-type graphical representation 820. The ring- or wheel-type graphical representation 820 may enable a user to toggle between various asset records. The toggling may occur by, for instance, rotating the wheel via a screen gesture, such as a swipe, push, or other screen gesture means for rotating and selecting from the ring/wheel.

Figure 9A:
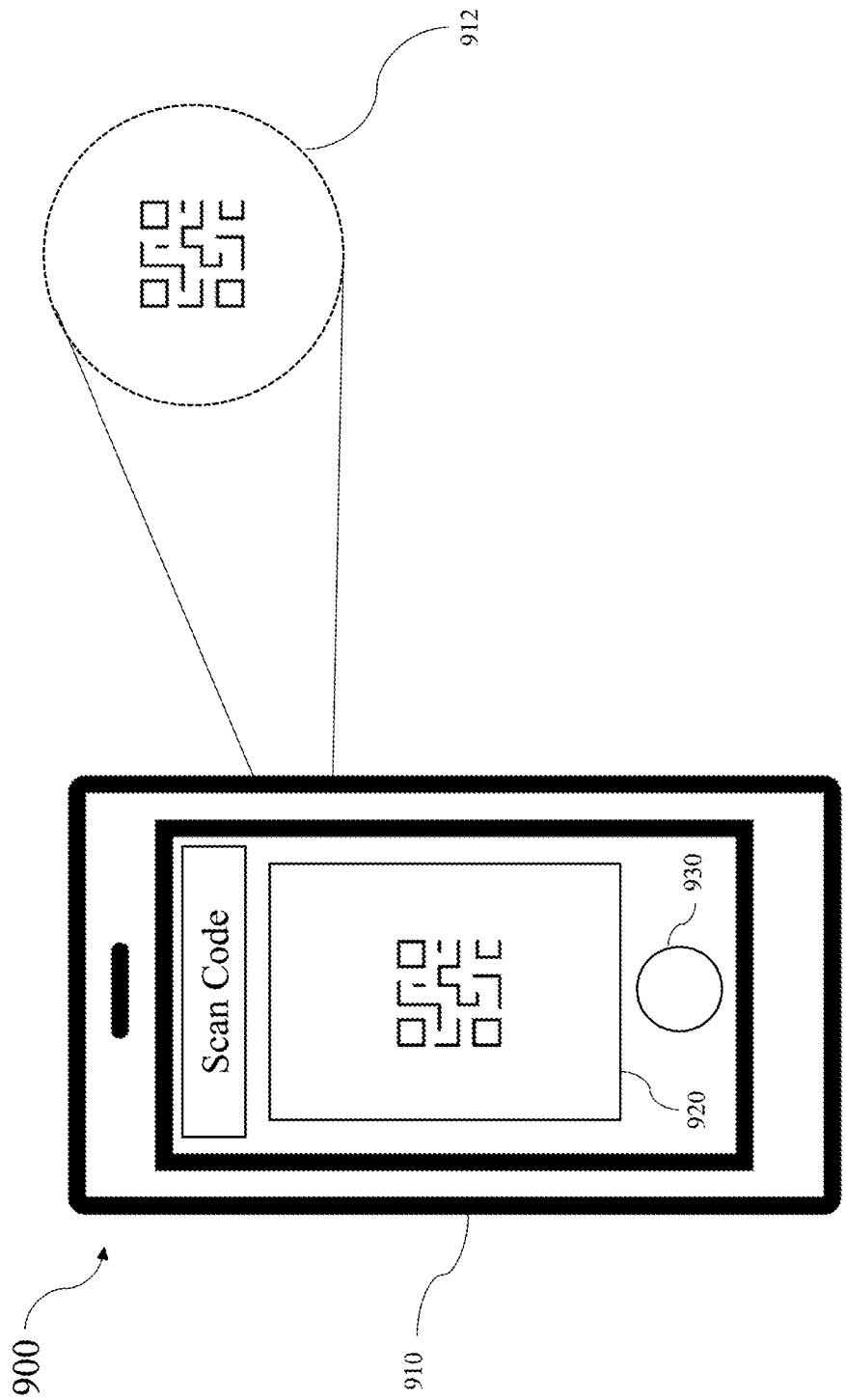
FIG. 9a is an example embodiment of an identifying mark interface for utilizing (e.g., scanning) an identifying mark to access asset record(s)

The user can readily access the asset record for the aircraft by selecting icon 830, or components of the aircraft by selecting icon 840. As mentioned above, the interface may provide a wheel type interface for rotating the wheel type interface in direction of arrowed line A, such that the desired icon to select (860, 850, 840, 830) is positioned at the top or upper part 870 of the wheel-/ring-interface 820. This graphical interface provides a graphical representation or experience that certain users may find easier to use, and as a result, are more likely to use than other interfaces. Inside the ring- or wheel-type graphical representation 820, a QR code icon 855 is shown. The operator may press or interact with the QR code icon 855 to scan an identifying mark 112 on a particular aircraft or aircraft component. See the below discussion in relation to FIG. 9a. Additionally, the user may select operator icon 850 to review their operator data (e.g., signature, geolocation) or other data associated with the device of the operating device, and the user may select icon 860 to see previous provenance data associated with the aircraft. Provenance data generally includes the data associated with any asset record access, ownership data, asset record updates, and authentication data associated with the same. The operator can review the provenance data to determine how and when the asset record(s) have been accessed, updated, or otherwise interacted with on the ledger. This interface is unique because it allows the user to easily maneuver through, inter alia, authenticated asset record(s) on the ledger using a remote computing device.

Figure 9B:
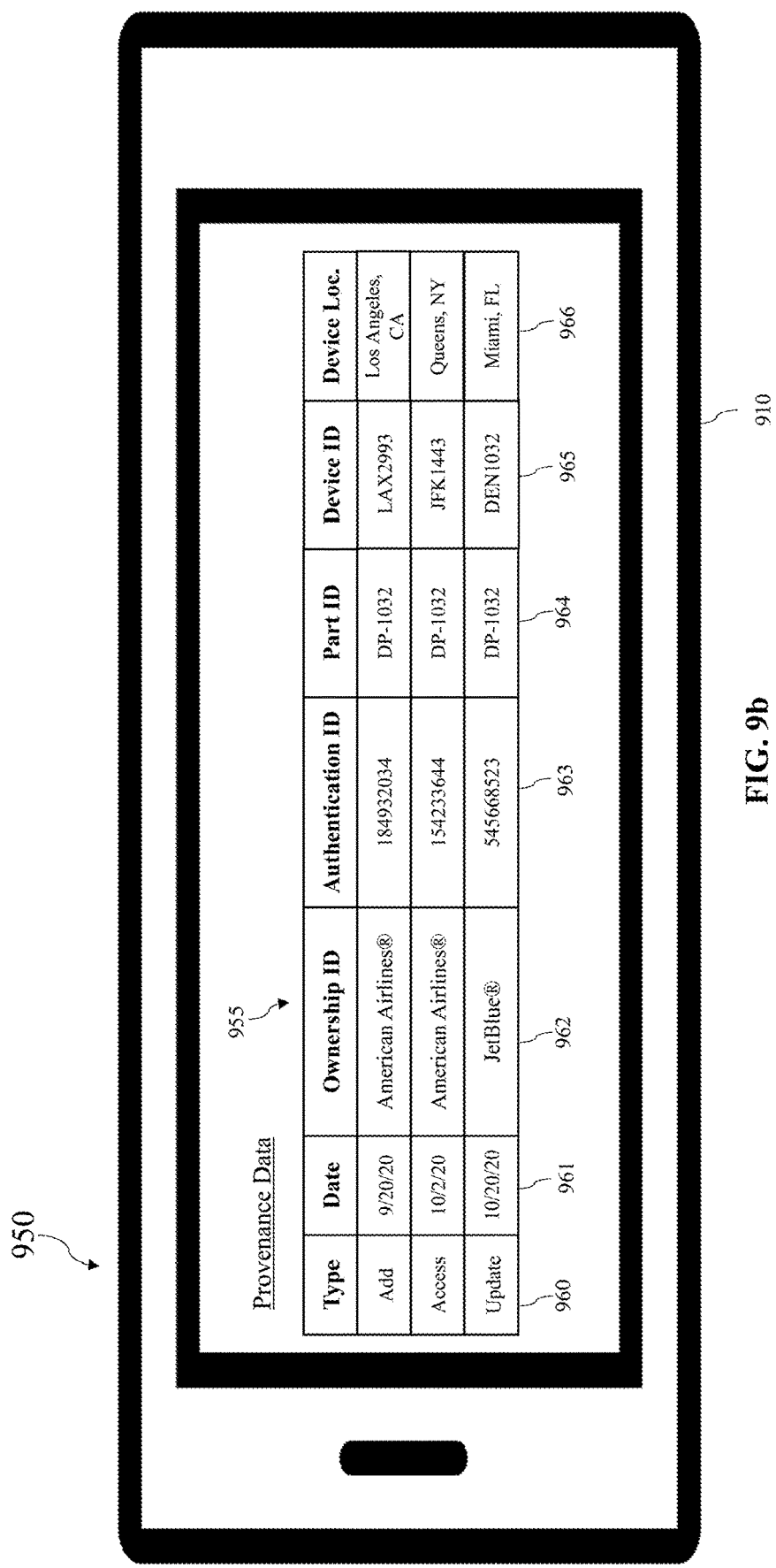
FIG. 9b is an example embodiment of a graphical user interface of a provenance data report.

With reference now to FIG. 9b, a graphical user interface of a provenance data report 950 is shown on remote computing device 910. As illustrated, the provenance data report 950 includes a plurality of columns of tabular data (960-965) in data table 955. The data table 955 includes a type column 960 (i.e., what type of transaction occurred on the ledger), a date column 961, an ownership ID column 962, an authentication ID column 963, a part ID column 964, a device ID column 965, and a device location (e.g., geolocation) column 966. The provenance data included in provenance data report 950 may inform an operator about how the asset record has been changed. For instance, in the type column 960, the initial record is an "add" type, meaning that the asset record was added to the ledger. In the subsequent data row, the second record is of an "access" type, meaning an operator (device ID: DEN1032) accessed the records. In the last row, the record is an "update" type, meaning the asset record was updated in that transaction. An operator interface like the provenance data interface 950 or similar interfaces may be advantageous for an operator to have. Although the systems and methods described herein are recognized as ensuring data integrity, the operator can readily review the data and determine if the data is appropriate. For instance, the part ID of the provenance data in table 955 may be incorrect. The operator can determine if the part ID was changed at some point in the past, or if the initial operator provided incorrect data. For example, the device ID column 965 includes device ID's from operators in (1) Los Angeles, California (LAX), (2) Queens, New York (JFK) and (3) Denver, Colorado (DEN) as indicated in the first three characters of the device ID. Conversely, the recorded device locations are in (1) Los Angeles, (2) Queens, and (3) Miami. Clearly the device location of (3) does not match with the device ID. In this way, the provenance data report 950 may inform the operator of incorrect data. Moreover, the ownership ID column 955 shows that the ownership of the part being investigated (part ID DP-1032) changed from AMERICAN AIRLINES® to JETBLUE®. The operator might consider this a discrepancy and investigate the chain of title of the part. These graphical displays may provide a simpler way to confirm that not only the data is correct, but also the chain of title and device which updated that data has also been authenticated.

After selecting an asset record through the operator interface 800 (e.g., via icon 840), the user may be directed to an asset record interface, such as the example asset record interface 870 shown in FIG. 8b. It is also understood that the example asset record interface may be included is displayed in a report like fashion, such as on a webpage. As illustrated, the asset record interface 870 includes a plurality of portions for the operator of computing device 810 to review and/or select. For instance, the interface 870 may display a time stamp data portion 871, a geolocation data portion 872, an authentication ID data portion 873, an operating device signature data portion 874, a maintenance data portion 875, and a component identifying data portion 876.

As an example, FIG. 8c shows operator interface or report 880, which is derived from interface 870 and has been populated with data associated with a particular device. FIG. 8c is contemplated as being an interface relating to the tires of the landing gear of an aircraft. Other types of data associated with different types of components may be used and are within the spirit and scope of the present invention. The maintenance data portion 885 shows that the last maintenance to occur was replacing the tires. Furthermore, the asset record for the tires was updated at 8:45 PM as shown in the time stamp data portion 881. The aircraft is identified as having the tires replaced at LAX (Los Angeles Airport) in the geolocation data portion 882. The graphical representation of the signature 884 of the operator associated with changing the tires is, "XZQ11A" as evidenced by the operating device signature data portion 874. Moreover, the transaction on the ledger has been certified (e.g., authenticated) and is associated with ID number 880154 in the certification data portion 883. The certification data portion allows the user to be certain that the information associated with a particular transaction has been authenticated because the computing device from which the data associated with transaction war received was authenticated device. In other words, the device that input the information has a signature that matches the signature stored on the server. The component identifying data portion 886 shows that the replacement tires were replaced with DUNLOP® tires, specifically DR26020T tires for a BOEING® 747. In this way, an operator interface or report (870, 880) for an asset record can readily apprise an operator of the most recent data. Furthermore, the operator may readily access historical data by selecting one of the portions (871-876, 881-886). Thus, in one embodiment, an operator interface comprises a plurality of portions, each portion displaying a single metric derived from the asset record. In one embodiment, the plurality of portions includes one or more of a time stamp data portion 871, a geolocation data portion 872, an authentication ID data portion 873, an operating device signature data portion 874, a maintenance data portion 875, and a component identifying data portion 876. In one embodiment, at least one of the portions (871-876) includes an embedded hyperlink to access a plurality of metrics associated with attributes (e.g., historical data). What's important to note is that the particular reports allow a user to easily determine whether or not the person (e.g., operator) updating a record, or viewing a record, did so from an authenticated device. Additionally, the reports allow a user to easily identify information that may be stored on a ledger and also allows the user to easily identify particular information associated with a particular asset.

As noted above, an identifying mark may be used to readily access an asset record. The asset record may be for an aircraft itself, or for any of the components of the aircraft. Regardless, the user may need to utilize the identifying mark, such as by scanning the identifying mark, to access the asset records. The user may use an exemplary operator interface, such as by selecting the QR code icon 855 on interface 820 shown in FIG. 8a, to access a scanning device (e.g., camera) from the operator's device. After doing so, the operator may be directed to an identifying mark interface, such as the identifying mark interface 900 shown in FIG. 9a. As shown, the interface opens the camera of remote computing device 910. The camera portion of the interface 920 reflects the physical identifying mark 912, which is a QR code. Scanning the identifying mark 912 may occur automatically (e.g., the software may auto-detect the QR code), and/or the user may need to press a capture button 930 to capture a photo of identifying mark 912 for subsequent processing to identify the identifying mark 912. Regardless, the identifying mark interface 900 allows the operator to quickly and easily access the asset records associated with a particular asset via the identifying mark 912.

As noted above, an asset record may be an asset record for an aircraft as a whole. The asset record for the aircraft may include a plurality of asset records associated with the various components of the aircraft. The aforementioned server may be configured to automatically review each asset record associated with the aircraft asset record and generate suggested maintenance tasks for the operator. The suggested maintenance tasks may be generated based on rules-based algorithms, machine learned algorithms, and combinations thereof. Advantageously, the operator can immediately electronically access this critical information by scanning an identifying mark. With reference now to FIG. 10a, a graphical user interface 1010 for an aircraft is shown. As illustrated, FIG. 10a is shown on a mobile device 1000, such as smartphone. The graphical user interface 1010 shows the aircraft 1020 and an identifying data element 1030 for the particular asset. Furthermore, graphical user interface or graphical report 1010 includes a notifying message 1040 (i.e., the number 3 that indicates 3 maintenance recommendations require the operator's review). A graphical user interface like interface 1010 illustrated in FIG. 10a may also include other information, such as a flight schedule 1050 and/or maintenance history 1060. The operator may readily access the maintenance recommendations by using a gesture to select the notifying message 1040. For instance, a swipe, push, or other screen gesture means for selecting the notifying message 1040. After selecting the notifying message 1040, the operator may be redirected to a new interface, such as interface 1012 shown in FIG. 10*b*. As illustrated, the maintenance recommendations interface 1012 shows three potential maintenance tasks that the operator should undertake before the aircraft is permitted to fly again. For instance, first recommendation 1041 is to replace the tires on the landing gear. The second recommendation 1042 is for the operator to initiate a "D check" on the aircraft, which may be a part of the airline's ABC check system for aircraft maintenance. Lastly, the third recommendation 1043 suggests replacing the anti-collision lights (e.g., red lights located on the top and bottom of the aircraft).

In one embodiment, after the generating the response message step 574, the method comprises transmitting, over the communications network, to the operator computing device 104 a user interface comprising a wheel type interface for toggling between at least a first subset of the plurality of attributes and a second subset of the plurality of attributes for the particular asset, wherein the first subset of the plurality of attributes are associated with original equipment manufacturer of the particular asset and wherein the second subset of the plurality of attributes are associated with maintenance, repair and operation of the particular asset.

At the operator's direction, the operator may submit an operator request message 240 using the operator interface. The operator request message 240 may be transmitted over the network and received by server 120. The operator request message 240 may include a first portion of code 241 for requesting at least a portion of (e.g., a metric associated with an attribute) an asset record from the ledger 114 on the blockchain 116. A second portion of code 242 may include (i) the unique asset identifier, (ii) an operator computing device signature associated with the particular operator computing device, and (iii) the geographic location of the operator computing device (e.g., a global positioning system ("GPS") coordinate). In a receiving step 420, the server 120 may receive the operator request message.

After receiving the operator request message in the receiving step 420, the server 120 may access the appropriate asset record requested by the operator request message 240 in the ledger 114. Accessing the asset record 223 may include generating, by the server 120, an access or query message 250. Next, the server may send a query or access message 250 may be sent to the blockchain 116. The access or query message 250 may include a signature 251 associated with the operator and/or the operator's device 104. Furthermore, the access or query message 250 may include a unique identifying data element 252 associated with identifying mark 112. After verifying the access message 250 is authentic message by querying the data on the blockchain, the blockchain 116 may send a blockchain response message 260 to server 120, the blockchain response message 260 including a copy of the asset record 261. A blockchain signature 262 may also be included in the blockchain response message 260 and may be used to ensure non-repudiation and data integrity of the request. The blockchain signature 262 may be a cryptographic signature, a non-cryptographic signature, and combinations thereof.

After the accessing step 430, the method includes a generating a response message step 440. The response message generating step 440 may include manipulating, by the server 120, the copy of asset record 261 from the blockchain response message 260 to fit the needs of the operator. For instance, the operator's request message may have requested a single metric from a plurality of possible metrics found in the asset record 223. The response generating step 440 may include re-formatting the copy of the asset record 261 to eliminate the unnecessary, non-requested metrics. In sum, the generating step 440 prepares an appropriate response message 270 that corresponds with the operator's request. In one embodiment, the response message includes (i) at least one metric 271 associated with at least one of the plurality of attributes of the particular asset and ii) a geographic attribute 272 corresponding to information related to the geographic location of the operator computing device.

Figure 5B:
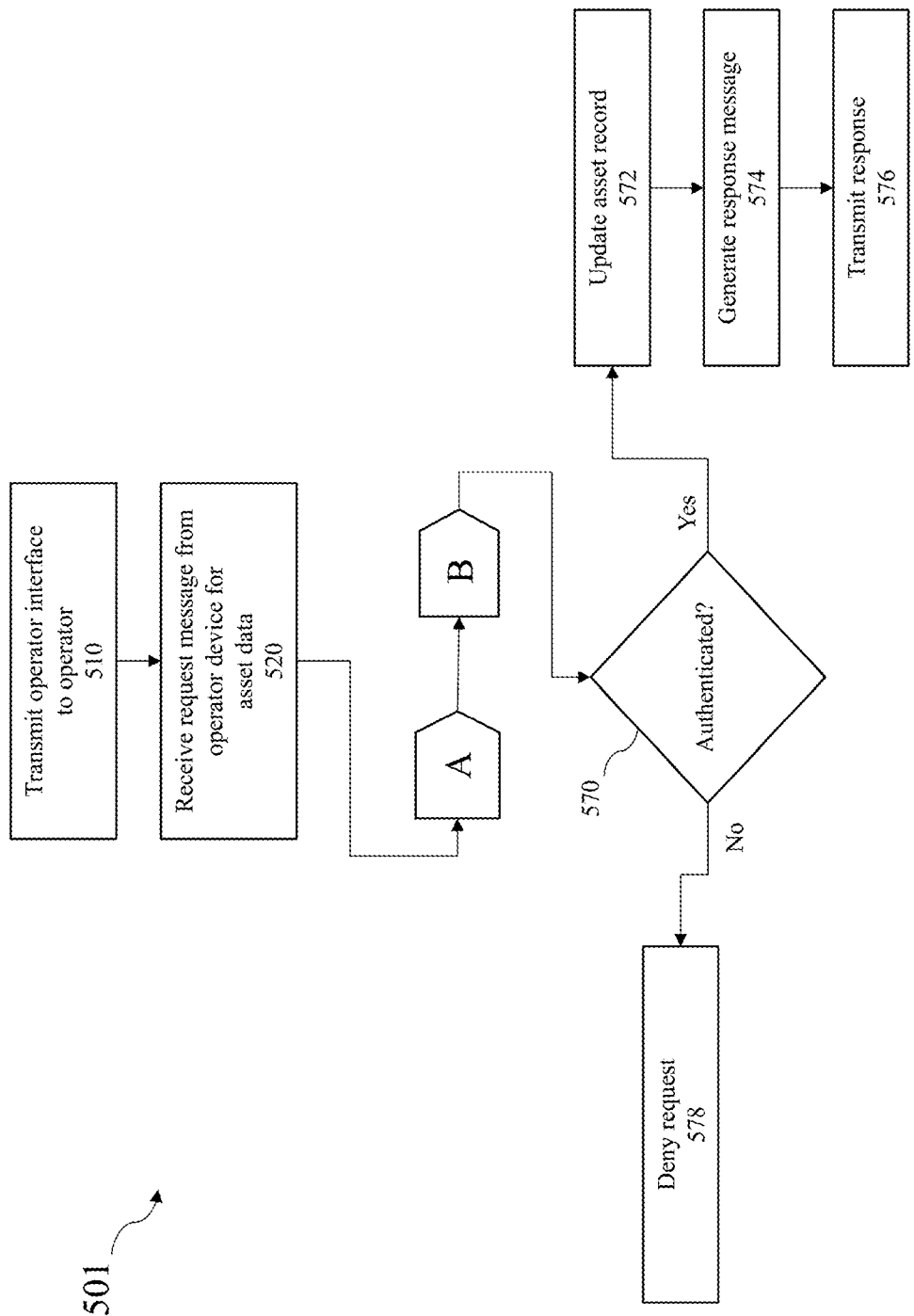
FIG. 5b is a block flow diagram of an example embodiment for updating or accessing, by an operator, an asset record.
Figure 5C:
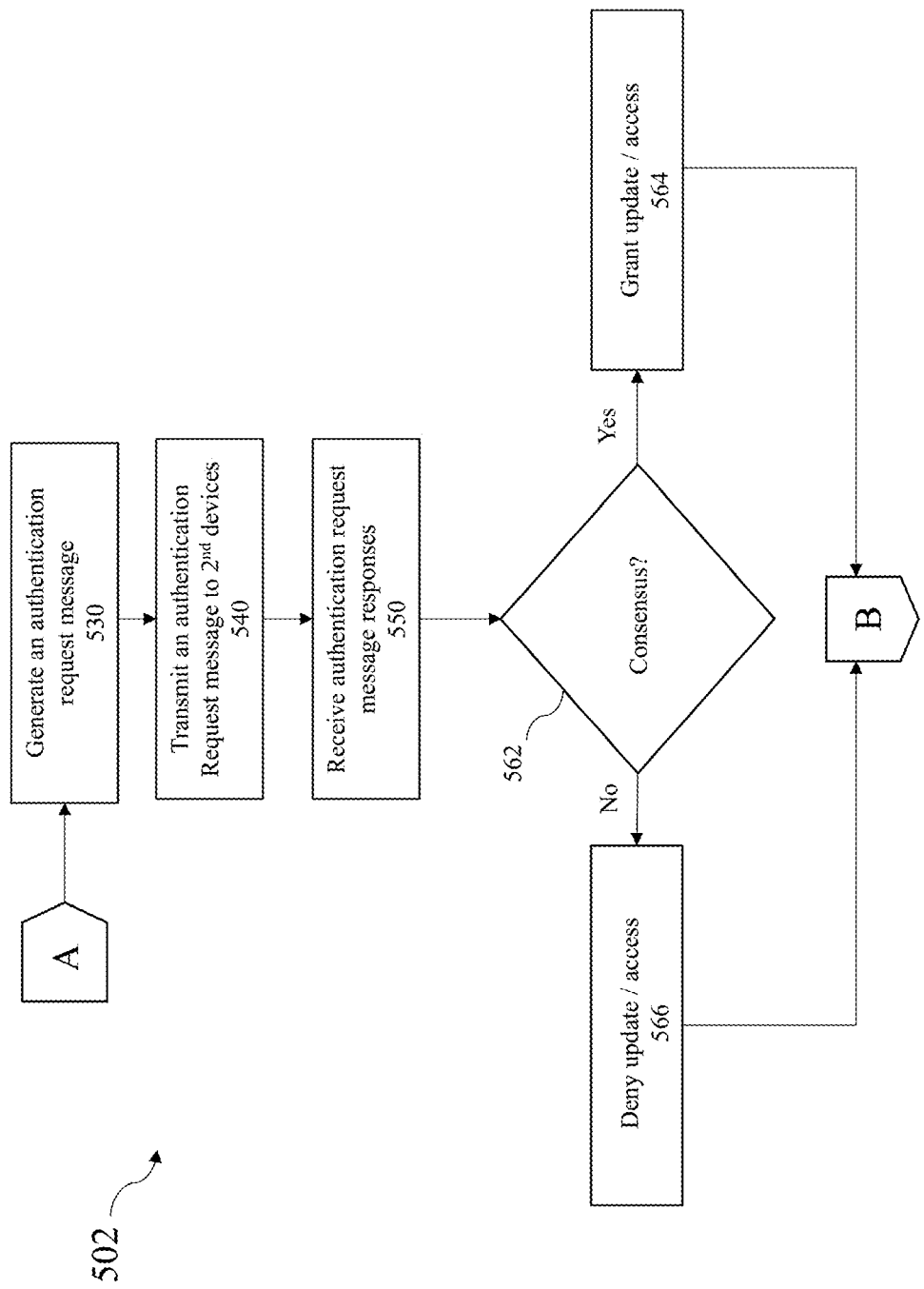
FIG. 5c is a block flow diagram of an example embodiment for authenticating an operator's request to access or update an access record by a plurality of decentralized second party devices.

With reference now to FIGS. 5*a*-5*c*, a system 500 and method (501, 502) for updating an asset record is shown. As will be described in greater detail below, an operator's request may be authenticated via a plurality of second devices (140*a*-140*c*). Authenticating the operator's device may be performed to ensure data integrity of asset records on the ledger 114.

Method 501 comprises a first transmitting step. In the transmitting step 510, a second operator interface for receiving operator input data is transmitted via second operator interface message 580 by server 120. The second operator interface message 580 is transmitted over the communications network and to the operator's device 104. The operator input data is generally associated with at least one metric of a particular attribute for a particular asset.

After the transmitting step 510, method 501 comprises a receiving step 520. The receiving step 520 comprises receiving, at the direction of an operator and over the communications network, an update request message 583 from the operator via the operator's device 104. The update request message generally includes a request to update at least one metric of a particular attribute for a particular asset. Furthermore, the update request message generally includes (i) the unique asset identifier 584, (ii) the operator computing device signature 585 associated with the operator computing device, (iii) the geographic location 586 for the operator computing device, and (iv) unauthenticated data 587. The unauthenticated data 587 generally includes data associated with the metric that has been identified in the update request message 583. A plurality of metrics, a plurality of attributes, and a plurality of assets may be updated with an update request message 583.

Following the receiving step 520, method 501 comprises a generating step 530 (follow off-screen connector A from FIG. 5*b* to FIG. 5*c*). The generating step 530 comprises generating, by server 120, an authentication request message 590. The authentication request message 590 may comprise (i) the data from the update request message 591, and (ii) a timestamp 592. After the generating step 530, server 120 may send the authentication request message 590 to a plurality of decentralized second computing devices (140*a*-140*c*) in transmission step 540. After the transmission step 540, each of the plurality of decentralized computing devices (140*a*-140*c*) may authenticate the authentication request message, such as authenticating the contents of the update request message (data 591 and timestamp 592). Authenticating the request message may include authenticating each portion of the data separately. For instance, second party device 140*a* may authenticate a first portion of the data, such as the manufacturing data. Second party device 140*b* may authenticate maintenance data. Lastly, second party device 140*c* may authenticate IPC data. Alternatively, all of the data may be authenticated by the second party devices. Authentication may also include authenticating by inspecting any signature(s) involved with the request message.

After the plurality of decentralized computing devices (140a-140c) authenticate the authentication request message 590, each of the plurality of decentralized computing devices (140a-140c) may send an authentication request message response (553a-553c). As illustrated, the plurality of authentication request message responses 552 comprise a first response 553a, a second response 553b, and a third response 553c from their respective second devices. The plurality of authentication request message responses 552 may include an approval or denial of the authentication request.

Regardless, server 120 may receive the plurality of authentication request message responses 552 in receiving step 550 and process them. The server 120 may determine if there is a threshold consensus 562 among the plurality of decentralized second devices. In other words, the server 120 pools the authentication request message responses (553a-553c) and determines if the data from the update request message meets data integrity standards and if the data should be implemented on ledger 114.

If a threshold consensus is met at 562, server 120 may grant access to ledger 114 in a granting step 564. Alternatively, a denial step 566 occurs. If a threshold consensus has been met, the request has been authenticated (i.e., the granting step 564 has occurred) at step 570, and the method comprises an updating step 572 for updating the asset record. The updating step 572 may comprise sending an update message 542. Update message 542 generally includes the data from the update request message 543. Blockchain 116 receives the update message 542 and updates the appropriate asset record(s) on ledger 114.

The threshold consensus may be adjusted depending on a variety of different factors. For example, the threshold census maybe a certain percentage of the authenticating devices finding that the data associated with the asset record or device (e.g., first device, operator device) is or has been authenticated. It is understood that the signature of each of computing device may be stored in the attached databases of the second party computing devices (not illustrated). In other embodiments, the threshold consensus may require 100% consensus. In certain embodiments, the second party computing devices may only authenticate a certain particular component of data. For example, one second party computing device may only authenticate whether the maintenance records are accurate. Additionally, another second party computing device may only authenticate a second particular component of data related to hey particular assets such as maintenance deadlines. However, it is understood that other types of data may be authenticated and each of the second party computing devices may only be configured to authenticate a particular portion of the entire data packet.

After the appropriate updating, the blockchain 116 may generate a response message in generating step 574. Generating the response message may include, for instance, preparing a message that includes the updated asset record (s). Regardless, update response message 545 is transmitted over the communications network to server 120. Server 120 may then send a copy of the response message 546 to the operator's device 104.

As noted above, in the event that a threshold consensus is not met at threshold consensus step 562, the server 120 may execute a denial step 566. The denial step 566 may deny access to requested asset records and/or deny a request to update a particular asset record. Thus, at step 570, the update request message is denied in step 578. Moreover, update response message 545 may include a denial message to be sent to the operator's device 104.

In some embodiments (not illustrated), a method comprises a second authentication step after an updating step. A second authentication step may allow for the plurality of decentralized second devices to authenticate that the asset record has been updated on the ledger. The second authentication step may be performed prior to the transmitting step 576 above, where the response message is transmitted to the operator's device. Thus, in one embodiment a method comprises generating a second authentication request message. The second authentication request message may comprise the data from the operator request message, and/or a second timestamp. After the generating step, the method comprises a transmitting step. The second transmitting step may comprise transmitting, over the communications network, to the plurality of decentralized second computing devices, the second authentication request message. After the transmitting step, the method may comprise a receiving step. The receiving step may comprise receiving, over the communications network, a second authentication request message response from each of the plurality of decentralized second computing devices. The second authentication request message responses may include at least one of a second approval or a second denial of the second authentication request message. After the receiving step, the server may determine if there is a threshold consensus has been met (e.g., to determine if the operator's update request was properly executed on ledger 114). If the desired threshold consensus is met, the method may comprise generating and sending a response message. Alternatively, the consensus step may be skipped, and the response message may be generated and sent only if the second authentication request message response comprises the approval (e.g., unanimous approval, at least one approval) of the second authentication request message.

iii. Computing Devices

Figure 11:
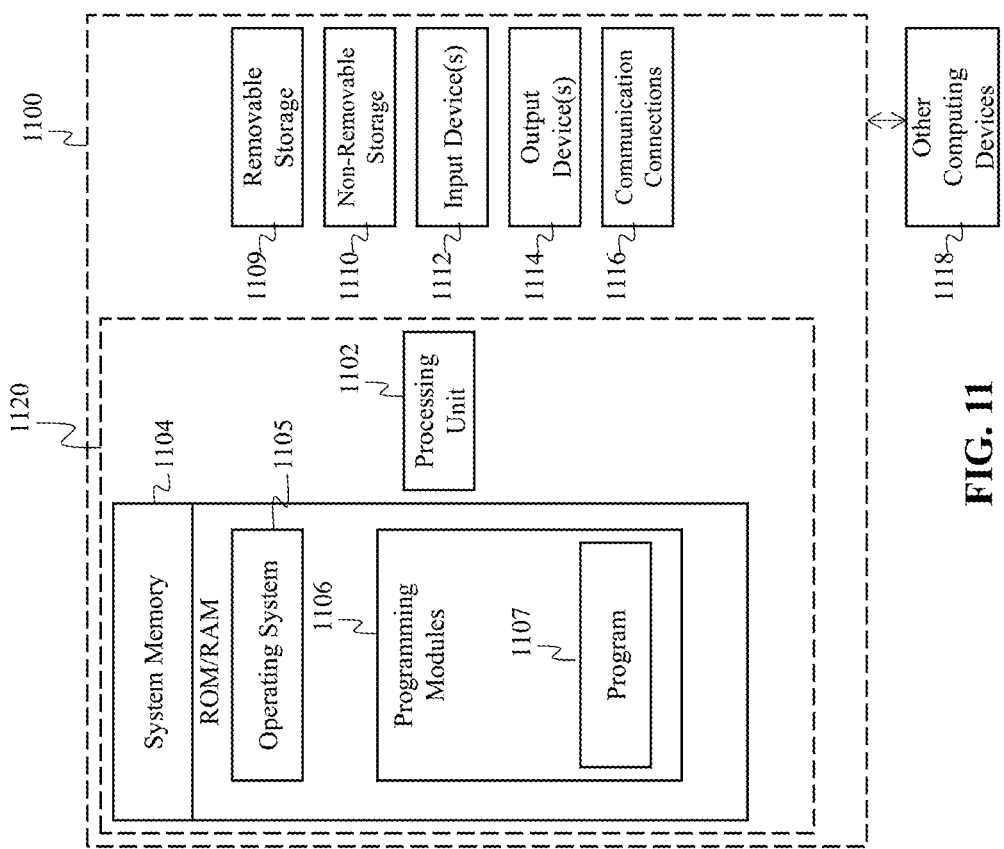
FIG. 11 is a block diagram of a system including an example computing device and other computing devices, according to an example embodiment.

FIG. 11 is a block diagram of a system including an example computing device 1100 and other computing devices. Consistent with the embodiments described herein, the aforementioned actions performed by devices 104, 110, 140a-140c, and server 120 may be implemented in a computing device, such as the computing device 1100 of FIG. 11. Any suitable combination of hardware, software, or firmware may be used to implement the computing device 1100. The aforementioned system, device, and processors are examples and other systems, devices, and processors may comprise the aforementioned computing device. Furthermore, computing device 1100 may comprise or be included in the systems for implementing graphical displays and interfaces as described above.

In a basic configuration, computing device 1100 may include at least one processing unit 1102 and a system memory 1104. Depending on the configuration and type of computing device, system memory 1104 may comprise, but is not limited to, volatile (e.g. random-access memory (RAM)), non-volatile (e.g. read-only memory (ROM)), flash memory, or any combination or memory. System memory 1104 may include operating system 1105, and one or more programming modules 1106. Operating system 1105, for example, may be suitable for controlling the computing device's 1100 operation. In one embodiment, programming modules 1106 may include, for example, a program module 1107 for executing the actions of server 120 and devices 104, 110, 140a-140c for example. Furthermore, embodiments of the invention may be practiced in conjunction with a graphics library, other operating systems, or any other application program and is not limited to any particular application or system. This basic configuration is illustrated in FIG. 11 by those components within a dashed line 1120.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by a removable storage 1109 and a non-removable storage 1110. Computer storage media may include volatile and nonvolatile, removable, and non-removable media implemented in any method or technology for storage of information, such as computer readable instructions, data structures, program modules, or other data. System memory 1104, removable storage 1109, and non-removable storage 1110 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a camera, a touch input device, etc. Output device(s) 1114 such as a display, speakers, a printer, etc. may also be included. The aforementioned devices are only examples, and other devices may be added or substituted.

Computing device 1100 may also contain a communication connection 1116 that may allow device 1100 to communicate with other computing devices 1118, such as over a network in a distributed computing environment, for example, an intranet or the Internet. Communication connection 1116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1104, including operating system 1105. While executing on processing unit 1102, programming modules 1106 (e.g. program module 1107) may perform processes including, for example, one or more of the stages of the methods described above. The aforementioned processes are examples, and processing unit 1102 may perform other processes and may also be configured to provide user interfaces displayed in FIGS. 8a-10b. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method executed by a server for disseminating reports, over a communications network, for a plurality of assets, the method comprising:
   a) receiving, from at least one first computing device, i) a first data packet comprising a plurality of asset data associated with a particular asset and ii) a first computing device signature associated with a first computing device;
       wherein the plurality of asset data comprises a unique asset identifier associated with the particular asset and a plurality attributes associated with the particular asset;

wherein each attribute has a metric and wherein the first computing device signature provides non-repudiation and data integrity of the first data packet;
b) creating, on an electronic ledger, an asset record;
c) recording, in the asset record, the plurality of asset data associated with the particular asset after authenticating the first computing device signature;
d) transmitting, over the communications network, an operator interface to a plurality of operator computing devices;
   wherein each operator computing device is associated with a unique operator computing device signature, and wherein the operator interface is configured for receiving an operator request for asset data for one of the plurality of assets;
e) receiving, over the communications network, at the direction of an operator, an operator request message for the asset data;
   wherein the asset data is associated with at least one of the plurality of attributes for one of the plurality of assets;
   wherein the operator request message for the asset data comprises i) the unique asset identifier, ii) an operator computing device signature associated with the operator computing device, iii) and a geographic location for the operator computing device;
f) accessing, in the electronic ledger, the asset record associated with the operator request and reading the plurality of asset data in the asset record;
g) generating a response message to the operator request based on the plurality of asset data in the asset record, wherein the response message corresponds to the operator request and includes i) at least one metric associated with at least one of the plurality of attributes of the particular asset and ii) a geographic attribute corresponding to information related to the geographic location of the operator computing device.

2. The method of claim 1, wherein the method further comprises:
a) transmitting, over the communications network, to the operator computing device, a second operator interface for receiving operator input data associated with the at least one metric of one of the plurality of attributes of the plurality of assets;
b) receiving, over the communications network, at the direction of the operator, from the operator computing device an update request message to update the at least one metric of one of the plurality of attributes of the plurality of assets, where the update request message comprises:
   i) the unique asset identifier;
   ii) the operator computing device signature associated with the operator computing device;
   iii) the geographic location for the operator computing device; and
   iv) unauthenticated data;
   where the unauthenticated data is associated with the at least one metric of one of the plurality of attributes of the plurality of assets;
d) generating an authentication request message, where the authentication request message comprises the data from the update request message and further including a timestamp;
e) transmitting, over the communications network, to a plurality of decentralized second computing devices, the authentication request message;
f) receiving, over the communications network, an authentication request message response from each of the plurality of decentralized second computing devices, where the authentication request message response includes at least one of an approval or denial of the authentication request message to update the at least one metric of one of the plurality of attributes of the plurality of assets; and,
g) updating the at least one metric of the plurality of attributes in the asset record only if a threshold consensus is received from the plurality of decentralized second computing devices.

3. The method of claim 1, wherein the method, before receiving the operator request message for the asset data, further comprises assigning a unique identifying data element with a printed mark attached to each asset of the plurality of assets, wherein the unique identifying data element corresponds with the unique asset identifier associated with each of the plurality of assets, wherein scanning the printed mark, at the direction of the operator, sends the operator request message for the asset data associated with at least one of the plurality of attributes for one of the plurality of assets.

4. The method of claim 1, wherein the asset record comprises at least a documentation associated with the particular asset, a certification associated with the particular asset, maintenance records associated with the particular asset, a geolocation associated with the particular asset, an Illustrated Parts Catalog (IPC) associated with the particular asset and Component Maintenance Manual (CMM) associated with the particular asset.

5. The method of claim 1, wherein the electronic ledger is distributed over a decentralized communications network.

6. The method of claim 1, wherein, after the generating the response message step, the method comprises transmitting, over the communications network, to the operator computing device a third user interface comprising a wheel type interface for toggling between at least a first subset of the plurality of attributes and a second subset of the plurality of attributes for the particular asset, wherein the first subset of the plurality of attributes are associated with original equipment manufacturer of the particular asset and wherein the second subset of the plurality of attributes are associated with maintenance, repair and operation of the particular asset.

7. The method of claim 3, wherein the printed mark is at least one a quick response code (QR code) and bar code.

8. The method of claim 1, wherein the particular asset is at least one of an aircraft or a part of the aircraft.

9. The method of claim 1, where the transmitting step comprises transmitting via Hypertext Transfer Protocol Secure (HTTPS).

10. A method executed by a server for disseminating reports, over a communications network, for a plurality of assets, the method comprising:
a) receiving, from at least one first computing device, i) a first data packet comprising a plurality of asset data associated with a particular asset and ii) a first computing device signature associated with a first computing device, wherein the plurality of asset data comprises a unique asset identifier associated with the particular asset and a plurality attributes associated with the particular asset, wherein each attribute has a metric and wherein the first computing device signature provides non-repudiation and data integrity of the first data packet;
b) creating, on an electronic ledger, an asset record;

c) recording, in the asset record, the plurality of asset data associated with the particular asset after authenticating the first computing device signature;

d) transmitting, over the communications network, an operator interface to a plurality of operator computing devices, wherein each operator computing device is associated with a unique operator computing device signature, and wherein the operator interface is configured for receiving an operator request for asset data for one of the plurality of assets;

e) receiving, over the communications network, at the direction of an operator, an operator request message for the asset data, wherein the asset data is associated with at least one of the plurality of attributes for one of the plurality of assets, where the operator request message for the asset data comprises i) the unique asset identifier, ii) an operator computing device signature associated with the operator computing device, iii) and a geographic location for the operator computing device;

f) accessing, in the electronic ledger, the asset record associated with the operator request and reading the plurality of asset data in the asset record;

g) generating a response message to the operator request based on the plurality of asset data in the asset record, wherein the response message corresponds to the operator request and includes i) at least one metric associated with at least one of the plurality of attributes of the particular asset and ii) a geographic attribute corresponding to information related to the geographic location of the operator computing device;

h) transmitting, over the communications network, the response message to the operator computing device;

i) transmitting, over the communications network, to the operator computing device a second operator interface for receiving operator input data associated with the at least one metric of one of the plurality of attributes of the plurality of assets;

j) receiving, over the communications network, at the direction of the operator, from the operator computing device an update request message to update the at least one metric of one of the plurality of attributes of the plurality of assets, where the update request message comprises i) the unique asset identifier, ii) the operator computing device signature associated with the operator computing device, iii) and the geographic location for the operator computing device, and iv) unauthenticated data, where the unauthenticated data is associated with the at least one metric of one of the plurality of attributes of the plurality of assets;

k) generating an authentication request message, where the authentication request message comprises the data from the update request message and further including a timestamp;

l) transmitting, over the communications network, to a plurality of decentralized second computing devices, the authentication request message;

m) receiving, over the communications network, an authentication request message response from each of the plurality of decentralized second computing devices, where the authentication request message response includes at least one of an approval or denial of the authentication request message to update the at least one metric of one of the plurality of attributes of the plurality of assets; and, n) updating the at least one metric of the plurality of attributes in the asset record only if a threshold consensus is received from the plurality of decentralized second computing devices.

11. The method of claim 10, wherein the method, before receiving the operator request message for the asset data, further comprises assigning a unique identifying data element with a printed mark attached to each asset of the plurality of assets, wherein the unique identifying data element corresponds with the unique asset identifier associated with each of the plurality of assets, wherein scanning the printed mark, at the direction of the operator, sends the operator request message for the asset data associated with at least one of the plurality of attributes for one of the plurality of assets.

12. The method of claim 11, wherein the electronic ledger is distributed over a decentralized communications network.

13. The method of claim 12, wherein, after the generating the response message step, the method comprises transmitting, over the communications network, to the operator computing device a third user interface comprising a wheel type interface for toggling between at least a first subset of the plurality of attributes and a second subset of the plurality of attributes for the particular asset, wherein the first subset of the plurality of attributes are associated with original equipment manufacturer of the particular asset and wherein the second subset of the plurality of attributes are associated with maintenance, repair and operation of the particular asset.

14. The method of claim 13, wherein the printed mark is at least one a quick response code (QR code) and bar code.

15. The method of claim 14, wherein the particular asset is at least one of an aircraft or a part of the aircraft.

16. The method of claim 15, where the transmitting step comprises transmitting via Hypertext Transfer Protocol Secure (HTTPS).

17. The method of claim 10, where the method further comprises, before transmitting the response message to the operator request:

a) generating a second authentication request message, where the second authentication request message comprises the data from the operator request message for the asset data and further including a second timestamp;

b) transmitting, over the communications network, to the plurality of decentralized second computing devices, the second authentication request message;

c) receiving, over the communications network, a second authentication request message response from each of the plurality of decentralized second computing devices, where the second authentication request message response includes at least one of a second approval or a second denial of the second authentication request message; and, d) generating and sending the response message only if the second authentication request message response comprises the approval of the second authentication request message.

18. A system, over a communications network, for disseminating reports for a plurality of assets, the system comprising:
an electronic ledger;
at least one processor configured for:
a) receiving, from at least one first computing device,
i) a first data packet comprising a plurality of asset data associated with a particular asset and ii) a first computing device signature associated with a first computing device, wherein the plurality of asset data comprises a unique asset identifier associated with the particular asset and a plurality attributes associated with the particular asset, wherein each attribute has a metric and wherein the first computing device signature provides non-repudiation and data integrity of the first data packet;

b) creating, on the electronic ledger, an asset record;

c) recording, in the asset record, the plurality of asset data associated with the particular asset after authenticating the first computing device signature;

d) transmitting, over the communications network, an operator interface to a plurality of operator computing devices, wherein each operator computing device is associated with a unique operator computing device signature, and wherein the operator interface is configured for receiving an operator request for asset data for one of the plurality of assets;

e) receiving, over the communications network, at the direction of an operator, an operator request message for the asset data, wherein the asset data is associated with at least one of the plurality of attributes for one of the plurality of assets, where the operator request message for the asset data comprises i) the unique asset identifier, ii) an operator computing device signature associated with the operator computing device, iii) and a geographic location for the operator computing device;

f) accessing, in the electronic ledger, the asset record associated with the operator request and reading the plurality of asset data in the asset record;

g) generating a response message to the operator request based on the plurality of asset data in the asset record, wherein the response message corresponds to the operator request and includes i) at least one metric associated with at least one of the plurality of attributes of the particular asset and ii) a geographic attribute corresponding to information related to the geographic location of the operator computing device.

19. The system of claim 18, wherein the at least one processor is further configured for:

after the generating the response message step, transmitting, over the communications network, to the operator computing device a third user interface comprising a wheel type interface for toggling between at least a first subset of the plurality of attributes and a second subset of the plurality of attributes for the particular asset, wherein the first subset of the plurality of attributes are associated with original equipment manufacturer of the particular asset and wherein the second subset of the plurality of attributes are associated with maintenance, repair and operation of the particular asset.

20. The system of claim 19, wherein the system further comprises a printing device for generating a printed mark to be physically attached with the plurality of assets and wherein the at least one processor is further configured for, before receiving the operator request message for data, assigning a unique identifying data element with the printed mark attached to each asset of the plurality of assets, wherein the unique identifying data element corresponds with the unique asset identifier associated with each of the plurality of assets, wherein scanning the printed mark, at the direction of the operator, sends the operator request message for the asset data associated with at least one of the plurality of attributes for one of the plurality of assets.

\* \* \* \* \*